United States Patent [19]

Smith

[11] Patent Number: 5,014,212
[45] Date of Patent: May 7, 1991

[54] APPARATUS FOR DISPENSING MONEY ORDERS

[75] Inventor: Lawrence G. Smith, Orlando, Fla.

[73] Assignee: Republic Money Orders, Inc., Dallas, Tex.

[21] Appl. No.: 558,671

[22] Filed: Jul. 27, 1990

Related U.S. Application Data

[60] Continuation of Ser. No. 406,979, Sep. 13, 1989, abandoned, which is a continuation of Ser. No. 121,074, Nov. 16, 1987, Pat. No. 4,870,596, which is a continuation of Ser. No. 60,762, Jun. 8, 1987, Pat. No. 4,812,986, which is a division of Ser. No. 877,539, Oct. 31, 1986, Pat. No. 4,699,532, which is a division of Ser. No. 596,291, Apr. 3, 1984, Pat. No. 4,625,275.

[51] Int. Cl.$^5$ .................. G06F 15/21; G06F 15/30
[52] U.S. Cl. .................. 364/479; 235/379; 235/432; 400/104; 400/121; 902/1
[58] Field of Search .............. 364/400, 401, 405, 406, 364/408, 478, 479, 519; 235/375, 379–382.5, 432, 433, 431; 400/121, 124, 104–106, 50, 103; 380/24; 902/1,2

[56] References Cited

U.S. PATENT DOCUMENTS

| | | | |
|---|---|---|---|
| 2,071,141 | 2/1937 | Placke | 235/3 |
| 3,814,227 | 6/1974 | Hurd, III et al. | 400/121 |
| 3,848,798 | 11/1974 | Riley | 235/101 |
| 3,970,992 | 2/1976 | Boothroyd | 364/900 |
| 3,984,660 | 10/1976 | Oka et al. | 235/379 |
| 3,997,763 | 12/1976 | Schasser | 235/432 |
| 4,025,905 | 5/1977 | Gorgens | 364/900 |
| 4,035,792 | 7/1977 | Price et al. | 340/570 X |
| 4,053,735 | 10/1977 | Foudos | 364/401 X |
| 4,082,945 | 4/1978 | Van De Goor et al. | 235/379 |
| 4,175,694 | 11/1979 | Donabin | 235/431 X |
| 4,225,779 | 9/1980 | Sano et al. | 364/900 X |
| 4,266,121 | 5/1981 | Hirose | 235/381 |
| 4,270,042 | 5/1981 | Case | 235/379 |
| 4,317,028 | 2/1982 | Simjian | 235/379 X |
| 4,341,951 | 7/1982 | Benton | 364/406 X |
| 4,355,369 | 10/1982 | Garvin | 364/900 |
| 4,385,285 | 5/1983 | Horst et al. | 235/379 X |
| 4,417,137 | 11/1983 | Lundblad | 235/379 X |
| 4,625,275 | 11/1986 | Smith | 364/479 X |
| 4,699,532 | 11/1986 | Smith | 364/479 X |
| 4,812,986 | 3/1989 | Smith | 364/479 |
| 4,870,596 | 9/1989 | Smith | 364/479 |

*Primary Examiner*—Joseph Ruggiero
*Attorney, Agent, or Firm*—Michael A. O'Neil

[57] ABSTRACT

A method and apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory (E$^2$PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

4 Claims, 3 Drawing Sheets

APPARATUS FOR DISPENSING MONEY ORDERS

This is a continuation of application Ser. No. 07/406,979 filed Sept. 13, 1989, abandoned, which is a continuation of Ser. No. 07/121,074 filed Nov. 16, 1987 now U.S. Pat. No. 4,870,596, which is a continuation of application Ser. No. 07/060,762 filed Jun. 8, 1987 now U.S. Pat. No. 4,812,986, which is a division of application Ser. No. 06/877,539 filed on Oct. 31, 1986, now U.S. Pat. No. 4,699,532, which is a division of application Ser. No. 05/596,291, filed Apr. 3, 1984, now U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser combersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory ($E^2PROM$). This $E^2PROM$ stores a security inhibit printing code which must be "recognized" by a printer software routine to enable the dot matrix printer. Each dispenser further stores a control software routine which operates to change or erase the security inhibit printing code stored in the $E^2PROM$ when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2PROM$ associated with each processor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
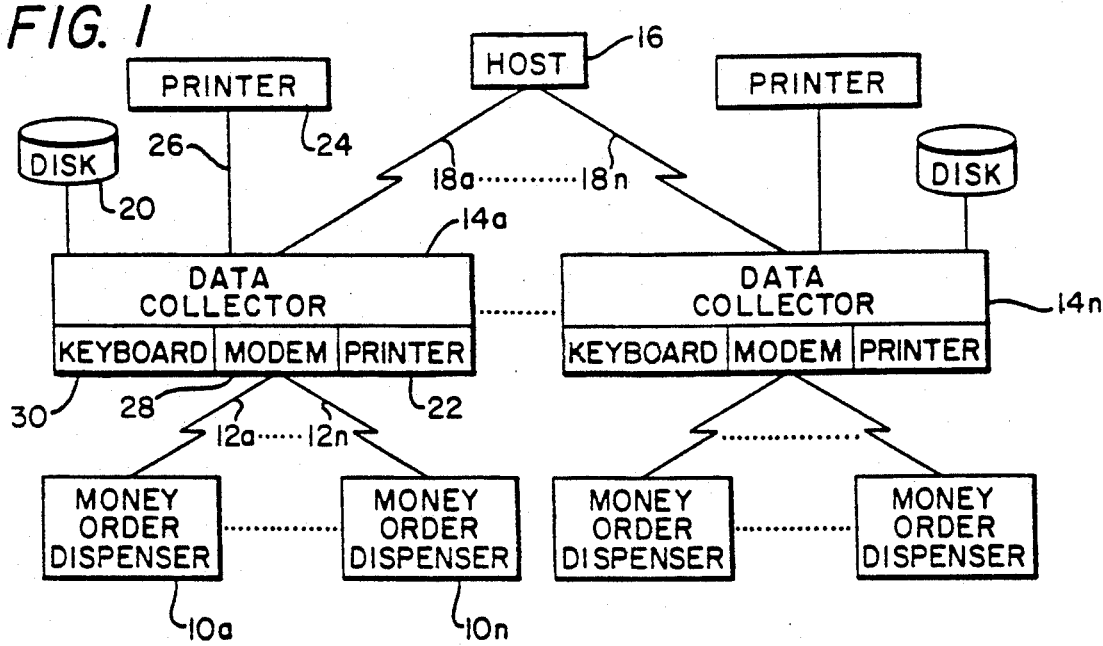
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a–10n on a time-shared basis. In the preferred embodiment, a plurality of data collectors 14a–14n are connected to a host device 16 through communications links 18a–18n. Each communications link 18 is either a modem link or an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a–10n. Data collector 14a also includes an internal printer 22 for printing this transaction information, although alternately, an external printer 24 is used for this purpose through an RS232 serial link 26. An internal modem 28 is also provided for direct communications to the money order dispensers 10a–10n over the communications links 12a–12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
| --- | --- |
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MOS XXXXX.XX-] | Maximum dollar value per money order per customer |
| [-MCH CK# XXXXX-] | Maximum number of vendor payments which may be printed before dispenser must be reauthorized |
| [-MCH CK# XXXXX.XX-] | Maximum vendor payment dollar amount which can be issued before dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN- #BLANKS XX-] | Number of blank money orders left in dispenser when warning issued |

TABLE I-continued

| VARIABLE NAME | DEFINITION |
| --- | --- |
| [-WARN- #TRANS XX-] | Amount of transaction storage left in dispenser memory when warning is issued |
| [-LOCK # ERRORS XX-] | Number of errors allowed before dispenser locks. |

As used throughout the remainder of the specification, the above limits and codes are referred to as "control" data. This control data is transmitted to the various money order devices 10a–10n located at the plurality of retail establishments.

Preferably, each of the other data collectors 14 shown in FIG. 1 include the same type of peripheral devices associated with the data collector 14a. The data collectors 14a–14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
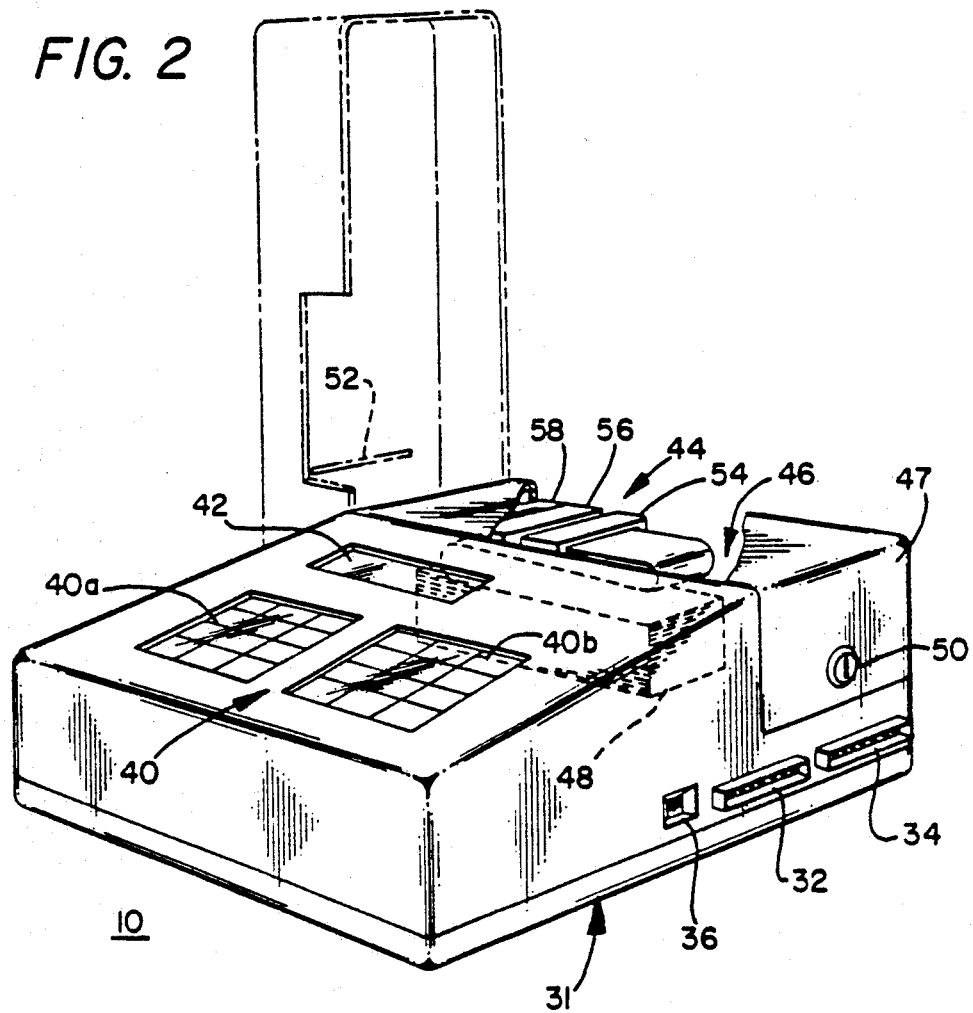
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Figures 3, 4:
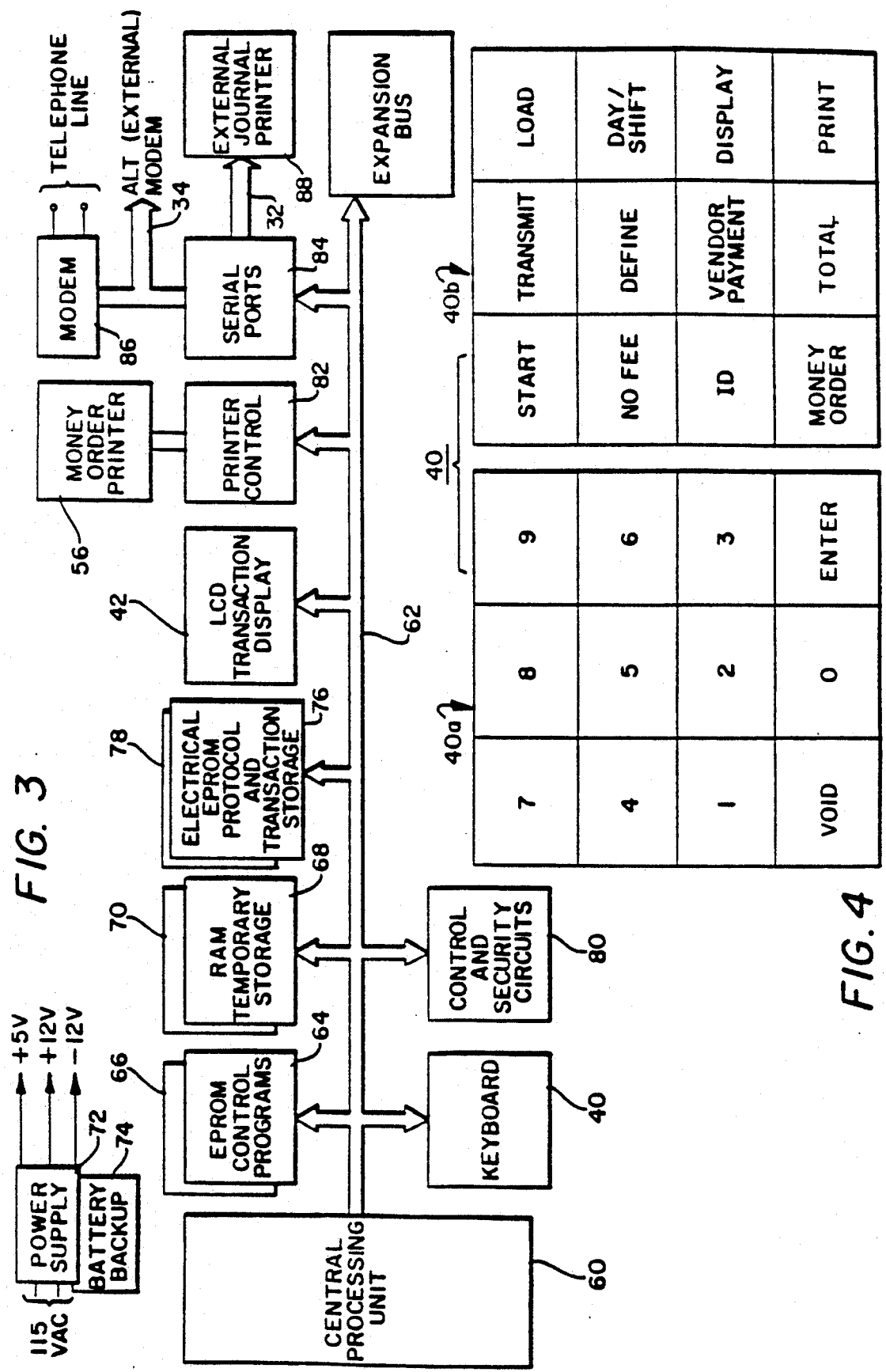
FIG. 3 is a block diagram of the electronic hardware incorporated in the money order dispenser of FIG. 2.
FIG. 4 is a representation of the preferred embodiment of the keyboard used in the money order dispenser of FIG. 2.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM's 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories (E$^2$PROM's)) or equivalent semi-permanent memory device such as a battery support RAM, 76 and 78 connected to the CPU 60 by the bus 62. The E$^2$PROM 76 is provided for storing various communication protocols utilized by the money order dispenser. In particular, the E$^2$PROM 76 supports the NCR foreign attachment protocol, MSI special protocol, SDLC protocol and IBM 3680 store system interface. Additional protocols may be down-loaded into the E$^2$PROM 76 by the data collector as required. Data and control codes for the above protocols are well known in the prior art and a description thereof is unnecessary for a complete understanding of the present invention.

According to a feature of the present invention, the E$^2$PROM 78 is provided to store the transaction data for between 500-2000 vendor/customer transactions. Moreover, the E$^2$PROM 78 also stores a security inhibit printing code for the money order dispenser 10 for security purposes. The printer software routine for controlling the dot matrix printer 56 must "recognize" the security inhibit printing code resident in E$^2$PROM 78 in order to operate the dot matrix printer 56. If the security of the money order dispenser is compromised in any way, a control software routine stored in EPROM 64 operates to change or erase the security inhibit printing code stored in the E$^2$PROM 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if a previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the E$^2$PROM 78 is approximately filled with transaction data. The money order dispenser 10 will discontinue further issuance of money orders and notify the operator if the E$^2$PROM 78 is full. According to the present invention, the transaction data is then transmitted to the respective data collector device of FIG. 1 before the money order dispenser 10 may again issue money orders. The use of the non-volatile reusable E$^2$PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY#_-]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

[-STXXXXXXXXXXXXXX-]

The store number may be 1–14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

[-ID USE  X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:
0—No ID Number needs to be entered;
1—All ID Numbers are entered at the start of the day only;
2—A valid ID Number must be entered for each transaction.

Entering of the above code information at the money order dispenser, as well as the information in TABLE I at the data collector, constitutes the Definition Mode. Once the last enter key has been pressed at the dispenser, the display screen 42 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID  -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 40b is also depressed. Subsequently, a dollar amount for the money order is entered via the numeric keys of the first section 40*a* followed by depression of the "MONEY ORDER" key of section 40*b*. The "TOTAL" key of section 40*b* is then depressed if more than one money order is required to be printed. The fee for each money order is automatically added to the total. Finally, the "PRINT" key of section 40*b* is then depressed and the requested money order is printed by the dot matrix printer 56 as discussed above with respect to FIG. 2. Note that if the "VOID" key of section 40*a* is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40*b* is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40*b*. Depression of these keys will produce the following sequential display messages:

[-SECURITY # -]

[-BEG #XXXXXXXX-]

[-END #XXXXXXXX-]

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40*b*. Upon depression of these keys, the following sequential display messages occur:

[-SECURITY # -]

[-DIAL TELEPHONE #-]

After entering of the security number and dialing the telephone number for connection to the appropriate data collector, the operator places the phone receiver in the modem. The "START" key is then depressed to cause the dispenser to transmit the stored transaction data in $E^2PROM$ 78 to the data collector. After transmission the following message is displayed to prompt the operator to disconnect the dispenser from the modem:

[-DISCONNECT RMOD-]

This constitutes the Transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashion, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Figure 5:
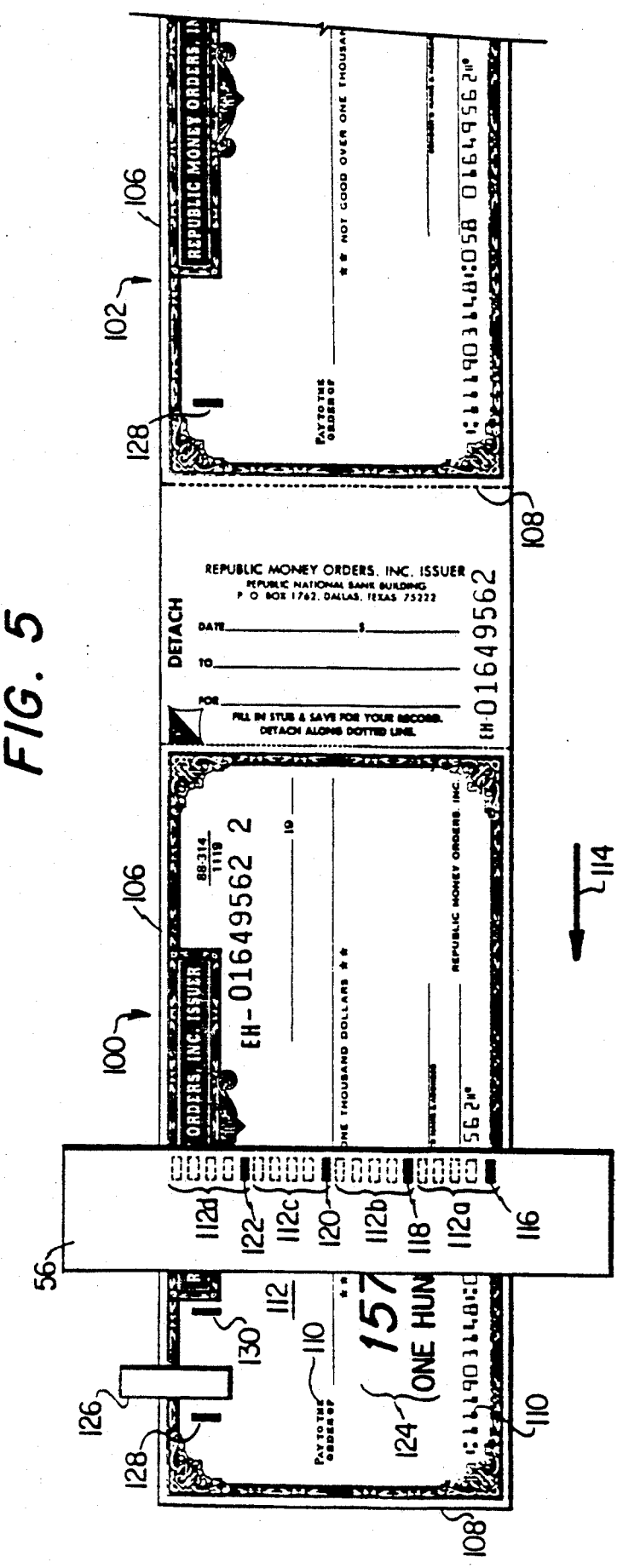
FIG. 5 is a top view of the dot matrix printer incorporated in the dispenser of FIG. 2 detailing the movement of a money order therethrough.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example, elements 116, 118, 120 and 122, each of which reciprocate transversely to print alphanumeric indicia in four regions of the printing zone 112. Specifically, print element 116 moves transversely through the region 112*a* of the printing zone 112, print element 118 moves transversely through the printing zone 112*b*, etc.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

```
EEPROM DATA AREA

PAGE
;EEPROM DATA LOCATED AT E000H-E3FFH
EPRM        SEGMENT AT 0E000H
;DOWN LOADED STORE INFORMATION
SCRTY       DM          ?           :SECUTITY NUMBER
STACC       DM          ?           :STORE #  MAJOR ACCOUNT
STSTE       DB          ?           :STORE #  STATE
STSUB       DB          ?           :STORE #  SUB ACCOUNT
STDIV       DM          ?           :STORE #  DIVISION
STSTR       DM          ?           :STORE #  STORE
MONTH       DB          ?           :DATE    MONTH
DAY         DB          ?           :DATE    DAY
YEAR        DB          ?           :DATE    YEAR
PHONE       DB          11 DUP(?)   :TELEPHONE NUMBER
USE         DB          ?           :ID USE CODE 0 NO ID NEEDS TO
                                     BE ENTERED
                                    :1-ONE ID PER SHIFT/DAY
                                    :2-ID FOR EVERY TRANSACTION
ID          DB          NID DUP(?)  :IDENTIFICATION NUMBERS

:RMOD STATUS INDICATORS - 0/1
RMODS       DB          ?           :RMOD STATUS - CLOSED/OPEN
MODMS       DB          ?           :MODEM STATUS - DISCNCT/DNCT
CMPPS       DB          ?           :MC PRINTER STATUS -
                                     OK/DISABLED
JRRRS       DB          ?           :JR PRINTER STATUS - OK
                                     DISABLED

RO Assembles 03-06-84               PAGE 1-8

EEPROM DATA AREA

KEYBS       DB          ?           :KEYBOARD STATUS - OK/LOCKED

;DATA DETERMINED AT RUN TIME-STORED HERE TO PRESERVE WHEN POWER
OFF
LOCKC       DB          ?           :ERROR COUNT BEFORE LOCKUP
TRPTR       DB          ?           :TRANSACTION POINTER
TXPTR       DB          ?           :TRASMISSION POINTER
FIDT        DB          NID DUP (?) :FEE TOTAL PER ID

MCNT        DW          ?           :MO NUMBER TOTAL
MAMT        DD          ?           :MO AMOUNT TOTAL
VCNT        DW          ?           :VP NUMBER TOTAL
VANT        DD          ?           :VP AMOUNT TOTAL
FAMT        DD          ?           :FE AMOUNT TOTAL
VOID        DW          ?           :NUMBER OF VOIDS
TCNT        DW          ?           :TOTAL TRANSACTIONS
TAMT        DD          ?           :TOTAL AMOUNT

:TRNSACTION BUFFER-FILLS UP REST OF EEPROM-ROTATING BUFFER
TRBFRS      DB          ?           :START OF TRANSACTION BUFFER
TRBFRE      DB          ?           :END OF TRANSACTION BUFFER
EPRM        ENDS

:EEPROM DATA LOCATED E4000H-E5FFFH
:DOWN LOADED PROTOCOL INFORMATION
```

```
EPRM      SEGMENT AT 0E400H
;$$$NO DATA DEFINED$$$
EPRM      ENDS
SUBTTL    START OF PROGRAM - POWER OF SELF TEST AND
          INITIALIZATION AT FE000H

START OF PROGRAM

PAGE

CODE      SEGMENT OF AFE00H
START:    CLI                       ;DISABLE INTERRUPTS
                                    ;TEST FLAGS, REGISTERS,
                                    ;    CONDITIONAL JUMPS
          MOV       AH,0D5H         ;SET FLAGS-SF,ZF,AF,PF,CF
          SAHF
          JNS       STERR
          JNZ       STERR
          JNP       STERR
          JNC       STERR
          LAHF
          MOV       CL,5            ;SET CARRY
          SHR       AH,CL
          JNC       STERR
          MOV       AL,40H          ;SET OVERFLOW
          SHL       AL,1
          JNO       STERR
          XOR       AX,AX           ;CLEAR FLAGS
          SAHF
          JS        STERR
          JZ        STERR
          JP        STERR
          JC        STERR
          LAHF
          MOV       CL,5            ;RESET CARRY
          SHR       AH,CL
          JC        STERR
          SHL       AH,1            ;RESET OVERFLOW
          JO        STERR
                                    ;TEST REGISTERS WITH ALL ONE'S
                                    ;    AND ZERO'S
          MOV       AX,OFFFFH
          STC                       ;SET CARRY - LOOP CONTROL
STRT1;    MOV       DX,AX           ;LOOP TO WRITE PATTERN TO ALL
                                    ;    REGISTERS
          MOV       BX,DS
          MOV       ES,BX
          MOV       CX,ES
          MOV       SS,CX
          MOV       DX,SS
          MOV       SP,DX
          MOV       BP,SP
          MOV       SI,BP
          MOV       DI,SI
          JNC       STRT2
          XOR       AX,DI           ;END OF FIRST TIME THROUGH
          JNZ       STERR           ;PATTERN NOT ALL ONE'S
          CLC                       ;CLEAR CARRY
          JNC       STRT1           ;REPEAT WTIH ALL ZERO'S
STERR;    HLT                       ;POWER ON SELT TEST ERROR
STRT2;    OR        AX,DI           ;END OF SECOND TIME THROUGH
          JNZ       STERR           ;PATTERN NOT ALL ZERO'S
                                    ;TEST RAM WITH FF,AA,55,01,00
                                    ;    PATTERNS
          SUB       AX,AX           ;INITIALIZE ES & DS
          MOV       ES,AX
          MOV       DS,AX
          SUB       DI,DI
          MOV       BX,LMCSD        ;COMPUTE UPPER LIMIT OF RAM
          MOV       CL,4
          SHL       BX,CL           ;CANNOT BE > OFFFFH
          OR        BX,O02EH        ;RAM COUNT
          MOV       AX,OFFFFH
          MOVE      DX,55AAH
```

```
              CLD                     ;INCREMENT FLAG
              MOV    CX,BX            ;COUNT
              REP    STOSB            ;FILL RAM WITH FIRST PATTERN
STRT3:        DEC    DI               ;POINT TO LAST BYTE
              STD                     ;DECREMENT FLAG
STRT4:        MOV    SI,DI
              MOV    CX,BX
STRT5:        LODSB                   ;READ PATTERN STORED
              XOR    AL,AH            ;TEST IF OK
              JNE    STERR            ;TEST NOT OK
              CMP    AH,0
              JE     STRT6            ;ZERO PATTERN
              MOV    AL,DL
              STOSB                   ;WRITE NEXT PATTERN
STRT6:        LOOP   STRT5            ;CONTINUE UNTIL ALL OF RAM TEST
              CMP    AH,0
              JE     STRT7            ;RAM TEST COMPLETE
              MOV    AH,AL            ;ROTATE PATTERN
              XCHG   DH,DL
              CLD                     ;INCREMENT FLAG
              INC    DI               ;POINT TO START BYTE
              JZ     STRT4            ;READ/WRITE FORWARD
              DEC    DI               ;READ/WRITE BACKWARD
              MOV    DX,1             ;00 AND 01 PATTERN
              JMP    STRT3
                                      ;INITIALIZE SEGMENT REGISTER & STACK
STRT7         MOV    AX,DATA
              MOV    DS,AX
              MOVE   AX,EPRM
              MOV    ES,AX
              MOVE   AX,STACK
              MOV    SS,AX
              MOV    SP,OFFSET STACKT
                                      ;INITIALIZE THE CHIP SELECT
                                      CONTROLLER
              MOV    DX,LMCSR         ;LOWER MEMORY CHIP SELECT
              MOVE   AX,LMCSD         ;16K at 0 - 3FFFH
              OUT    DX,AX
              MOV    DX,PACSR         ;PERIPHERAL CHIP SELECT
              MOV    AX,PACSD
              OUT    DX,AX
              MOV    DX,MMCSR         ;MID-RANGE MEMORY CHIP SELECT
              MOV    AX,MMCSD         ;16K AT E0000H
              OUT    DX,AX
              MOV    DX,MPCSR         ;MID-RANGE MEMORY SIZE
              MOV    AX,MPCSD
              OUT    DX,AX
                                      ;INITIALIZE 8155 - A
              MOV    DX,A8155CS       ;CONTROLS CLOCK, KEYBOARD, DISPLAY
              MOV    AL,A8155CD       ;PORT A,B,C OUTPITS, NO TIMER
              OUT    DX,AL
              INC.   DX               ;PORT A ADDRESS
              MOV    AL,A8155DA       ;ALL OUTPUTS HIGH
              OUT    DX,AL
              INC    DX               ;PORT B ADDRESS
              OUT    DX,AL
              INC    DX               ;PORT C ADDRESS
              OUT    DX,AL
              INC    DX               ;TIMER LOW COUNT ADDRESS
              MOV    AL,A8155TD       ;NO TIME
              OUT    DX,AL
              INC    DX               ;TIMER HIGH COUNT ADDRESS
              OUT    DX,AL

;INITIALIZE 8155 - B
              MOV    DX,B8155CS       ;MONITORS DIP SWITCHES
              MOV    AL,B8155CD       ;PORT A INPUTS, B&C OUTOUTS, NO TIMER
              OUT    DX,AL
              INC    DX               ;PORT A ADDRESS
              MOV    AL,B8155DA       ;ALL INPUTS HIGH
              OUT    DX,AL
              INC    DX               ;PORT B ADDRESS
              OUT    DX,AL            ;ALL OUTPUTS HIGH
```

```
            INC      DX              ;PORT C ADDRESS
            OUT      DX,AL
            INC      DX              ;TIMER LOW COUNT ADDRESS
            MOV      AL,B8155TD      ;NO TIME
            OUT      DX,AL
            INC      DX              ;TIMER HIGH COUNT ADDRESS
            OUT      DX,AL
;$$$NO PROGRAM YET$$$                ;INITIALIZE THE DMA CONTROLLER
;$$$NO PROGRAM YET$$$                ;INITIALIZE THE TIME CONTROLLER
;$$$NO PROGRAM YET$$$                ;INITIALIZE THE INTERRUPT CONTROLLER
            CALL     CLKINT          ;INITIALIZE CLOCK
            CALL     DSPINT          ;INITIALIZE DISPLAY
            CALL     JPRTINT         ;INITIALIZE JOURNAL PRINTER
            CALL     CPRTINT         ;INITIALIZE CHECK PRINTER
                                     ;SET UP INTERRUPT VECTOR TABLE
            MOV      ES:NMIPTR,OFFSET NMI
            MOV      ES:NMIPTR+2, CODE
            MOV      ES:TMROPTR,OFFSET TMR0
            MOV      ES:TMROPTR+2, CODE
            MOV      ES:DMA0PTR, OFFSET DMA0
            MOV      ES:DMA0PTR+2,CODE
            MOV      ES:DMA1PTR,OFFSET DMA1
            MOV      ES:DMA1PTR+2,CODE
            MOV      ES:INT0PTR,OFFSET INT0
            MOV      ES:INT0PTR+2,CODE
            MOV      ES:CLCKPTR,OFFSET CLCK
            MOV      ES:CLCKPTR+2,CODE
            MOVE     ES:INT2PTR,FFSET INT2
            MOV      ES:INT2PTR+2,CODE
            MOV      ES:INT3PTR,OFFSET INT0
            MOV      ES:INT3PTR+2,CODE
            MOV      ES:TMR1PTR,OFFSET TMR1
            MOV      ES:TMR1PTR+2,CODE
            MOV      ES:TMR2PTR,OFFSET TMR2
            MOV      ES:TMR2PTR+2,CODE

CALL     DSPCLR          ;CLEAR DISPLAY
            CLD                      ;FILL KEYBOARD BUFFER WITH SPACES
            MOV      DI,OFFSET KBFR
            MOVE     CX,SKBFR
            MOV      AL,20H
  REP       STOSB
            STI                      ;ENABLE INTERRUPTS
  STRT9:    CALL     RMDCK           ;CHECK RMOD
            CALL     KEYB            ;SCAN KEYBOARD
            CALL     PWRCK           ;CHECK FOR POWER DOWN
            JMP      STRT8           ;LOOP FOREVER
  CODE      ENDS

;POWER ON RESET VECTOR - LOCATED AT 0FFFFF0H
RESET       SEGMENT AT 0FFFFH
            MOV      DX,UMCSR        ;UPPER MEMORY CHIP SELECT
            MOV      AX,UMCSD        ;8K AT FE000H
            OUT      DX,AX
            JMP      FAR PTR START
            DB       'RM00'
RESET ENDS
      END

CRO Asembler 03-05-84   Page 1-3

INT VECTOR 3 - NON MASKABLE INTERRUPT - RMOD INTERLOCK

Page

;NMI     PROCEDURE-REENTRANT, NONMASKABLE INTERRUPT
    ;           ENTRY-INTERRUPT 2
    ;           EXIT-RMODS=1 - OPEN
            PUBLIC NMI
  NMI       PROC     NEAR
            PUSH     BP
            MOV      BP, SP          ;ESTABLISH BASE POINTER
            PUSH     BX
            PUSH     AX
```

```
                PUSHF
                MOV         BX,OFFSET RMODS  ;WRITE RMOD OPEN
                                                      INDICATOR
                MOV         AL,01H
                CALL        WEEPRM    ;WRITE TO EEPROM ONE
                                                      BYTE
                POPF
                POP         AX
                POP         BX
                POP         BP
                IRET
    NMI         ENDP
      SUBTTL                INTO - INTERRUPT 0
CRO Assembler 03-05-84      Page 1-1
STERS TITLE   RMDCK - CHECK RMOD STATUS REGIS
        STERS
                PAGE        66,132
        CGROUP  GROUP       CODE, CONST, RESET
        CGROUP  GROUP       INTV, STACK,DATA
        EGROUP  GROUP       PRM EPRM    SEGMENT     PUBLIC EPRM
                EXTRN       RMODS:BYTE, CKPRS:BYTE
                EXTRN       JRPRS:BYTE, KEYBS:BYTE, LCCKC:BYTE
                EXTRN       LOCK:BYTE
        EPRM    ENDS CODE    SEGMENT PUBLIC CODE
        ASSUME  CS:CGROUP, DS:DGROUP, SS:DGROUP,ES:EGROUP
                EXTRN       WEEPRM:NEAR ;RMDCK PROCEDURE - CHECK ALL VITAL RMOD STATUS REGISTERS
;            IF RMOD WAS OPENED                - RMODS=1 OR
;            IF ERROR COUNT EQUALS MAXIMUM     - LOCKC=LOCK
;            THEN MONEY ORDER PRINTER IS DISABLED - CKPRS=1AND
;               JOURNAL PRINTER IS DISABLED    - LRPRS=1AND
;               KEYBOARD IS LOCKED             - KEYBS=1
                PUBLIC RMDCK
        RMDCK   PROC        NEAR
                XOR         AL,AL
                TEST        RMODS,01H       ;TEST RMOD FOR OPEN
                JNZ         RMDCK1          ;OPEN
                MOV         AH,LOCKC        ;ERROR COUNT
                CMP         AH,LOCK         ;MAXIMUM ERROR COUNT
                JB          RMDCK2          ;MAXIMUM ERROR COUNT
                                             NOT REACHED
        RMDCK1: INC AL
        RMDCK2: MOV BX,OFFSET CKPRS ;MONEY ORDER PRINTER-
                                             0=ENABLE,1=DISABLE
                CALL        WEEPRM
                INC         BX      ;JOURNAL PRINTER - 0=ENABLE,1=DISABLE
                CALL        WEEPRM
                INC         BX      ;KEYBOARD        - 0=ENABLE,1=LOCKED
                CALL        WEEPRM
                RET
        RMDCK   ENDP
        CODE    ENDS
                END
RO Assembler 03-06-84       Page 1-1

TITLE           KEYB - KEYBOARD MODULE
                Page    66,132

DATA    SEGMENT PUBLIC 'DATA'
        EXTRN   MOVP:BYTE  TOTS:BYTE   DSPR:BYTE   SHFT:BYTE FEEC:BYTE
        EXTRN   KEY:BYTE   KEYP:BYTE   KEYT:BYTE   KEYD:BYTE
        EXTRN   KNDG:BYTE  KCMD:BYTE   KPCMD:BYTE
        EXTRN   KENTN:BYTE KENTP:WORD
        EXTRN   KNBR:BYTE  KFLD:BYTE   KLCK:BYTE
        EXTRN   KDSP:BYTE  KONT:BYTE   KTPE:BYTE
        EXTRN   KLLMT:DWORD            KULMT:DWORD
        EXTRN   KPTR:DWORD KBIN:DWORD  KBPTR:DWORD
```

```
        EXTRN    CHR:BYTE    CMIN:BYTE   CSEC:BYTE
        EXTRN    CSCRTY:WORD
        EXTRN    CSACC:DWORD              CXNBR:DWORD  CSCHK:BYTE
        EXTRN    CID:BYTE    CIDL:BYTE
        EXTRN    CCNT:WORD   CAMT:DWORD  DFEE:DWORD   CTOT:DWORD
        EXTRN    DFIDT:DWORD
        EXTRN    CMCNT:WORD  CMAMT:DWORD
        EXTRN    CVCNT:WORD  CVAMT:DWORD
        EXTRN    CTCNT:WORD  CTAMT:DWORD
        EXTRN    KBFR:BYTE   DBFR:BYTE   SCRTCH:BYTE
DATA ENDS

EPRM SEGMENT PUBLIC 'EPRM'
        EXTRN    SCRTY:WORD
        EXTRN    STACC:WORD STSTE:BYTE STSUB:BYTE   STDIV:WORD STSTR:WORD
        EXTRN    MONTH:BYTE DATE:BYTE   YEAR:BYTE
        EXTRN    PHONE:BYTE
        EXTRN    USE:BYTE                ID:BYTE
        EXTRN    FEELMT:DWORD            FEEAMT:DWORD
        EXTRN    MCNTC:WORD              MCNTM:WORD
        EXTRN    MAMTC:DWORD             MAMTM:DWORD
        EXTRN    VCNTC:WORD              VCNTM:WORD
        EXTRN    VAMTC:DWORD             VAMTM:DWORD
        EXTRN    BLANKS:BYTE             TRANS:BYTE  LOOK:BYTE
        EXTRN    BSACC1:WORD   BSNBS1:DWORD    BSCHK1:BYTE
        EXTRN    ESACC1:WORD   ESNBR1:DWORD    ESCHK1:BYTE
        EXTRN    BSACC2:WORD   BSNBR2:DWORD    BSCHK2:BYTE
        EXTRN    ESACC2:WORD   ESNBR2:DWORD    ESCHK2:BYTE
        EXTRN    RMODS:BYTE    MODMS:BYTE      CKPRS:BYTE
        EXTRN    JRPRSLBYTE    KEYBS:BYTE      LOCKS:BYTE
EPRM ENDS

CODE SEGMENT PUBLIC 'CODE'
        EXTRN    PWRON:NEAR
        EXTRN    WEEPRM:NEAR
        EXTRN    TRNS:NEAR
        EXTRN    DISP:NEAR   JPRT,NEAR   CPRT:NEAR
        EXTRN    ASCBN:NEAR  BNASC:NEAR
        EXTRN    DPCMP:NEAR  DPADD:NEAR  DPSUB:NEAR   DPMUL:NEAR  DPDIV:NEAR
CODE ENDS

DGROUP   GROUP      CODE, CONST, RESET
        DGROUP   GROUP      INIV. STACK DATA
CODE SEGMENT PUBLIC 'CODE'

RO Assembler 03-06-84          Page 1-2

ASSUE CS:CGROUP, DS:GROUP, SS:DGROUP, ES:EGROUP

;KEYBOARD CONSTANTS

NID     EQU     20              ;NUMBER OF IDENTIFICATION CODES
NFEE    EQU     20              ;NUMBER OF FEES
NTR     EQU     16              ;NUMBER OF TRANSACTIONS PER
                                 CUSTOMER/VENDOR
SKBFR   EQR     16              ;SIZE OF KEYBOARD BUFFER
SDBFR   EQU     16              ;SIZE OF DISOLAY BUFFER
KBDCS   EQU     300H            ;KEYBOARD COMMAND/STATUS ADDRESS
KBDCD   EQU     00DH            ;PORT A & C OUTPUT, B INPUT
KBDRS   EQU     0FBH            ;ROW 1 SELECT
KBDRM   EQU     00FH            ;READ MASK
KNKEY   EQU     24              ;NUMBER OF KEYS
KNROW   EQU     6               ;NUMBER OR ROWS
KNCOL   EQU     4               ;NUMBER OF COLUMNS
KDBNC   EQU     4               ;BEBOUNCE CONSTANT
KBYTE   EQU     1               ;BYTE ENTRY
KWORD   EQU     2               ;WORD ENTRY
KDWRD   EQU     3               ;DWORD ENTRY
KREAL   EQU     4               ;REAL ENTRY
KALPHA  EQU     5               ;ALPHA ENTRY
KEY0    EQU     00H             ;0
KEY1    EQU     01H             ;1
```

```
KEY2      EQU    02H           :2
KEY3      EQU    03H           :3
KEY4      EQU    04H           :4
KEY5      EQU    05H           :5
KEY6      EQU    06H           :6
KEY7      EQU    07H           :7
KEY8      EQU    08H           :8
KEY9      EQU    09H           :9
KEYEN     EQU    0AH           :ENTER
KEYVD     EQU    0BH           :VOID
KEYST     EQU    0CH           :START
KEYNF     EQU    0DH           :NO FEE
KEYID     EQU    0EH           :ID
KEYMO     EQU    0FH           :MONEY ORDER
KEYTX     EQU    10H           :TRANSMIT
KEYDF     EQU    11H           :DEFINE
KEYVP     EQU    12H           :VENDOR PAYMENT
KEYTO     EQU    13H           :TOTAL
KEYLD     EQU    14H           :LOAD
KEYDY     EQU    15H           :DAY/SHIFT
KEYDS     EQU    16H           :DISPLAY
KEYBR     EQU    17H           :PRINT
KEYDATA   DB     KEYLD         :KEY CODE TABLE
          DB     KEYDY
          DB     KEYDS
          D      KEYPR
          DB     KEYTX
          DB     KEYDF
          DB     KEYBP
          DB     KEYTO
          DB     KEYST
          DB     KEYNF
          DB     KEYID
          DB     KEYMO
          DB     KEY6
          DB     KEY3
          DB     KEYEN
```

CRO Assembler 03-06-84          Page 1-3

```
          DB     KEY8
          DB     KEY5
          DB     KEY2
          DB     KEY0
          DB     KEY7
          DB     KEY4
          DB     KEY1
          DB     KEYVD
KEYJT     DW     KENT          :KEYBOARD JUMP TABLE
          DW     KVOID
          DW     KSTRT
          DW     KNFEE
          DW     KID
          DW     KMO
          DW     KTRNS
          DW     KDEFN
          DW     KVP
          DW     KTOTL
          DW     KLOAD
          DW     KSHFT
          DW     KDISP
          DW     KPRNT
:DATA ENTRY AND DISPLAY TABLES
:NUMBER OF DATA ITEMS TO BE ENTERED
:16 CHARACTER DISPLAY
:NUMBER OF POSSIBLE ENTRIES PER DATA ITEM
:NUMBER OF FIELDS
:NUMBER OF ERRONEOUS ENTRIES BEFORE RMOD LOCKS
:DISPLAY START OF ENTRY - 0-NO DISPLAY
:NUMBER OF CHARACTERS PER DISPLAY - 0-NONE, ALLOWED
:TYPE OF DATA - 1-BYTE, 2-WORD, 3-DWORD, 4-REAL, 5-ALPHA
:LOWER LIMIT - 0-NO LIMIT CHECK, FFFFFFFF-CHECK AGAINST ARRAY
```

```
                IN UPPER LIMIT
:UPPER LIMIT
:DATA STORAGE POINTER
KSTRTN    EQU       2                      :START OF DAY KEYBOARD DATA
KSTRTD    DB        'ID                    ',20,1,5

DB        14,3,1
          DD        0FFFFFFFFH,ID
          DD        CIDL
          DB        'BEG#                  ',1,3,0

DB        6,3,2
          DD        0FFFFFFFFH,BSACC1
          DD        CSACC
          DB        9,6,3
          DD        0FFFFFFFFH,DBNBR1
          DD        CSNBR
          DB        16,12,1
          DD        0FFFFFFFFH,BSCHK1
          DD        CSCHK
          DD        0FFFFFFFFH,SCRTY
          DD        CSCRTY'        DB
'DIAL TELELPHOHE #',0,0,0

DB        0,0,0
          DD        0,0

DD        TRNS
          DB        'DISCONNECT RMOD ',0,0,0

DB        0,0,0
          DD        0,0

DD        0
EFNN      EQU       19                     :DEFINE KEYBOARD DATA-ENTERED BY
                                           MANAGER
EFND      DB        'SECURITY#             ',1,1,0

DB        0,5,2
          DD        0,0

DD        SCRTY
          DB        'ST                    ',1,5,0

DB        3,3,2
          DD        0,0

DD        STACC
          DB        6,2,1
          DD        0,0

DD        STSTE
          DB        8,2,1
          DD        0,0

DD        STSUB
          DB        10,3,2
          DD        0,0

DD        STDIV
          DB        13,4,2
          DD        0,0

DD        STSTR
          DB        'DATE      /  / ',1,3,0
          DD        MONTH
          DB        12,2,1
          DD        1,31
```

```
         DD      DAY
         DB      15,2,1
         DD      0,0

DD      YEAR
         DB      'TIME        :   :    ',1,3,0

DB      9,2,1
         DD      0,24

DD      CHR
         DB      12,2,1
         DD      0,59

DD      CMIN
         DB      15,2,1
         DD      0,59

DD      CSEC
         DB      'PHNE        ',1,1,0

DB      6,11,5
         DD      0,0

DD      PHONE
         DB      'ID USE      ',1,1,0

DB      16,1,1
         DD      0,2

DD      USE
         DB      'ID          ',20,1,0

DB      14,3,1
         DD      0,255

DD      ID
         DB      'FE          ',20,2,0

DB      2,3,4
         DD      0,99999999

DD      FEELMT
         DB      12,4,4
         DB      'CST MO#     ',0,1,0
```

O Assembler 03-06-84         PAGE 1-6

```
         DB      12,5,2
         DD      0,0

DD      MCNTC
         DB      'MCH MO#     ',0,1,0

DB      12,5,2
         DD      0,0

DD      MCNTM
         DB      'CST MO$     ',0,1,0

DB      8,8,4
         DD      0,0

DD      MAMTC
         DB      'MCH MO$     ',0,1,0

DB      8,8,4
         DD      0,0
```

```
         DD      MAMTM
         DB      'VND CK#        ',0,1,0

DB      12,5,2
         DD      0,0

DD      VCNTC
         DB      'MCH CK#        ',0,1,0

DB      12,5,2
         DD      0,0

DD      VCNTM
         DB      'VND CK$        ',0,1,0

DB      8,8,4
         DD      0,0

DD      MAMTC
         DB      'MCH CK$        ',0,1,0
         DD      0,0

DD      VAMTM
```

RO Assembler 03-06-84          Page 1-7

```
         DB      'WARN # BLANKS  ',0,1,0

DB      15,2,1

DD      0,0
         DB      'WARN # TRANS   ',0,1,0

DB      15,2,1
         DD      0,0

DD      TRANS
         DB      'LOCK # ERRORS  ',0,1,0

DB      15,2,1
         DD      0,0

DD      LOCK
KLOADN   EQU     3
KLOADD   DB      'SECURITY #     ',1,1,5

DB      0,5,2
         DD      0FFFFFFFFH,SECRTY
         DD      CSCRTY
         DB      'BEG#           ',1,3,0

DB      6,3,2
         D       0FFFFFFFFH,STACC
         DD      BSACC2
         DB      9,6,3
         DD      0,0

DD      BSNBRS2
         DB      16,1,1
         DD      0,0

DD      BSCHK2
         DB      'END#           ',1,3,0

DB      6,3,2
         DD      0FFFFFFFFH,STACC
         DD      SACC2
```

```
                DB          9,6,3
                DD          0,0
KEYBOARD MONITOR PRCEDURE

PAGE
;KEYBOARD MONITOR PROCEDURE
                PUBLIC      KEYB
KEYB            PROC        NEAR
                MOV         AL,KEYBS        ;$$$SECURITY CHECK$$$
                XOR         AL,AL
                JNZ         KEYB0           ;$$$KEYBOARD LOCKED$$$
                CALL        KEYSC           ;SCAN KEYBOARD FOR KEY
                                            DEPRESSED
                CMP         AL,KNKEY
                JL          KEYB1
KEYB0:          RET                         ;NO KEY OR NON-EXIST KEY
KEYB1:          XOR         CX,CX
                CMP         AL,10
                JL          KNMBR           ;NUMBER 0-9
                XCHG        KCMD,AL         ;ROTATE COMMANDS
                MOV         KPCMD,AL        ;SAVE PREVIOUS COMMAND
                SUB         AL,10
                MOV         CL,AL
                PUSH        CX              ;SAVE JUMP TABLE INDEX
                MOV         CL,KCNT         ;NUMBER OF DIGITS ALLOWED
                CMP         KNDG,0          ;NUMBER OF DIGITS ENTERED
                JZ          KEYB4           ;NO DATA ENTERED
                MOV         DI,KPTR         ;OFFSET OF DATA STORAGE IF ANY
                MOV         SI,OFSET KBIN   ;TEMPORARY BINARY STORAGE
                MOV         BX,OFFSET SCRTCH
                MOV         AX,KBPTR        ;OFFSET OF DATA ENTERED
                CMP         KTPE,KALPHA     ;CHECK DATA TYPE
                JE          KEYB2           ;ALPHA
                PUSH        AX              ;SAVE KEYBOARD BUFFER ADDRESS
                PUSH        SI
                PUSH        BX
                PUSH        CX
                CALL        ASCBN           ;CONVERT TO BINARY
                PUSH        SI              ;POINTER TO CONVERTED BINARY
                                            NUMBER
                MOV         AX,OFFSET KLLMT
                PUSH        AX              ;LOWER LIMIT
                CALL        DRCMP           ;COMPARE
                SAL         AX,1
                JC          KEYB5           ;ERROR-NUMBER/LOWER LIMIT
                MOV         AX,OFFSET KULMT
                PUSH        AX              ;UPPER LIMIT
                PUSH        SI              ;CONVERTED BINARY NUMBER
                CALL        DPCMP           ;COMPARE
                SAL         AX,1
                JC          KEYB5           ;ERROR-UPPER LIMIT/NUMBER
                MOV         CL,KTPE
                CMP         CL,KDWRD
                JNE         KEYB2
                INC         SX              ;ADJUST DWORD COUNT
KEYB2:          MOV         AX,DS           ;TRANSFER DATA ENTERED
                CMP         KPTR+2,AX
                JE          KEYB3           ;DESTINATION=EE PROM
                MOV         BX,KPTR
KEYB2A          LODSB
                CALL        WEEPRM          ;DESTINATION=EE PROM
                INC         BX
                LOOP        KEYB2A
KEBY3:          OR          AX,AX
                JE          KEYB4           ;NO TRANSFER, LEAVE IN KBIN
REP             MOVSB
```

RO Assembler 03-006-84         Page 1-10

KEYBOARD MONITOR PROCEDURE

```
KEYB4:          POP         BX              ;RETRIEVE JUMP TABLE INDEX
                SHL         BX,1            ;COMPUTE JUMP ENTRY
```

```
            JMP         KEYJT [BX]        ;PROCESS KEY
KEY35:      POP         BX
            CALL        KERR
            RET
KNMBR:      ADD         AL,30H            ;CONVERT TO ASCII
            CLD
            MOV         SI,OFFSET KBFR+1
            MOV         DI,OFFSET KBFRR
    MOV     CX,SKBFR-1
    REP     MOVSB                         ;ROTATE KBFR TO LEFT
            STOSB                         ;ADD NEW CHARACTER TO RIGHT
            INC         KNDG              ;DIGIT COUNT
            CMP         KDSP,0            ;CHECK FOR DISPLAY
            JZ          KNMBR3            ;NO DISPLAY ALLOWED .
            MOV         DI,OFFSET DBFR-1
            XOR         CH,CH
            MOV         CL,KDSP
            ADD         DI,CX
            MOV         SI,OFFSET KBFR+SKBFR
            MOV         CL,KCNT
            SUB         SI,CX
            MOV         KBPTR,SI          ;SAVE KBFR OFFSET
            PUSH        DI                ;SAVE START OF DISPLAY
            PUSH        CX                ;SAVE NUMBER OF CHARACTERS IN
                                          DISPLAY
            MOV         BL,KTPE           ;TUPE OF ENTRY BEING PROCESSED
            CMP         BL,KREAL
            JNE         KNMBR1
            POP         CX
            INC         CX                ;ADD DECIMAL POINT TO COUNT
            PUSH        CX
            SUB         CX,3              ;REAL ENTRY
KNMBR1:
REP         MOVSB                         ;MOVE KBFR TO DBFR
            CMP         BL,KREAL          ;CHECK FOR REAL ENTRY
            JNE         KNMBR2
            MOV         AL,'.'            ;REAL ENTRY
            STOSB
            MOV         CL,2              ;MOVE FRACTION
REP         MOVSB
KNMBR2:     MOV         AK,DKSP           ;START OF MESSAGE (1-16)
            MOV         AL,05H            ;CURSOR LINE, ON
            PUSH        AX
            CALL        DISP
KNMBR3:     RET
KENTR:      NGP                           ;ENTER KEY - $$$NO PROGRAM$$$
KVOID:      MOV         AH,MOVP           ;VOID KEY
            MOV         AL,TOTS           ;TOTAL STATUS
            CMP         AH,1
            JE          KOID1             ;MONEY ORDER VOID
            CMP         AH,2
            JE          KVPOID2           ;VENDOR PAYMENT VOID
            CALL        KERR              ;ERROR-CLEAR ENTRY & BEEP
            RET
KVOID1:     MOV         SI,OFFSET CVCNT   ;VENDOR PAYMENT VOID
            MOV         DI,OFFSET CVAMT
KVOID3:     BX,BX                         ;CAMT,CFEE INDEX
```

KEYBOARD MONITOR PROCEDURE

```
            MOV         CX,CCNT           ;# OF MO/VP ENTERED
            CMP         AL,0
            JNE         KVOID4            ;TOTAL KEY DEPRESSED, VOID
                                          ALL
            MOV         AL,4              ;VOID LAST ENTRY
            DEC         CL
            MUL         CL
            MOV         BX,AX
            MOV         CL,1
KVOID4:     PUSH        CX                ;# OF ENTRIES TO BE VOIDED
KVOID5:     DEC         CCN               ;REDUCE COUNT
```

```
                DEC     CVCNT
                CMP     TOTS,1
                JNZ     KVOID6
                DEC     CTCNT                   ;REDUCE TOTAL TRANSACTIONS
KVOID6:         LOOP    KVOID5
                POP     CX
                PUSH    CX
                PUSH    DI                      ;SAVE CMAMT/CVAMT OFFSET
KVOID7:         MOV     SI,OFFSET CAMT
                ADD     SI,BX
                MOV     DI,OFFSET CTOT
                PUSH    SI
                PUSH    DI
                CALL    DPSUB                   ;CTOT=CTOT-MO/VP
                CMP     MOVP,1
                JNE     KVOID9
                PUSH    SI                      ;REDUCE FEES
                CMP     TOTS,0
                JE      KVOID8
                MOV     SI,OFFSET CFEE          ;SUBTRACT FEE FROM CTOT
                ADD     SI,CX
                PUSH    SI
                PUSH    DI
                CALL    DPSUB                   ;CTOT=CTOT-CFEE
KVOID8:         XOR     AX,AX                   ;ZERO FEE
                MOV     [SI],AX
                MOV     [SI+2],AX
                POP     SI
KVOID9:         POP     DI
                POP     SI
                PUSH    DI
                CALL    DPSBU                   ;CMAMT/CVAMT=CMAMT/CVAMT-MO/VP
                POSH    DI
                CMP     TOTS,1
                JNZ     KVOID10
                MOV     DI,OFFSET CTAMT         ;REDUCE TOTAL AMOUNT
                PUSH    SI
                PUSH    DI
                CALL    DPSUB
KVOID10:        POP     DI
                XOR     AX,AX
                MOV     [SI],AX                 ;ZERO CAMT
                MOV     [SI+2],AX
                INC     BX
                INC     BX
                JZ      KSTRT1                  ;SECOND START KEY
                CALL    PWRON                   ;POWER ON
                RET
```

RO Assembler 03-06-84                Page 1-12

KEYBOARD MONITOR PROCEDURE

```
KSTRT1:         MOV     AL,KSTRTN               ;START DATA
                MOV     SI,OFFSET KSTRTD
                CALL    KINIT                   ;INITIALIZE KEYBOARD AND
                                                 DISPLAY VARIABLES
                RET
KNFEE:          MOV     FEEC,1                  ;NO FEE KEY - FECC=1
                RET
KID:            MOV     SI,OFFSET KBIN          ;ID KEY
                LODSB
                MOV     CID,AL
                PUSH    ES                      ;CHECK FOR VALID ID
                MOV     AX,EPRM
                MOV     DI,OFFSET ID            ;EEPROM ADDRESS
                MOV     CX,NID                  ;NUMBER OF IDS
                REPNE   SCASB
                POP     ES
                JB      KID1
                MOV     CID,0                   ;ZERO CURRENT ID
                CALL    KERR                    ;ERROR-WIPE OUT ENTRY AND
                                                 BEEP
```

```
KID1:   RET                             ;MATCH FOUND
KMO:    MOV     SI,OFFSET KBIN          ;MONEY ORDER KEY
        MOV     DI,OFFSET CTOT
        PUSH    SI
        PUSH    DI
        CALL    DPADD                   ;CTOT=CMAMT+AMT ENTERED
        MOV     DI,OFFSET CMAMT
        PUSH    SI
        PUSH    DI
        CALL    DPADD                   ;CMAMT=CMAMT+AMT ENTERED
        PUSH    ES
        MOV     AX,EPRM
        MOV     ES,AX
        MOV     DI,OFFSET MONTC         ;EEPROM ADDRESS
        MOV     AX,CCNT
        CMP     AX,NTR                  ;CHECK NUMBERS
        JGE     KMOE                    ;MONEY ORDERS EXCEEDED PER
                                         SYSTEM
        CMP     AX,ES:WORD PTR[DI]
        JGE     KMOE                    ;MONEY ORDERS EXCEEDED PER
                                         MACHINE
        MOV     SI,OFFSET CTOT          ;CHECK AMOUNT PER CUSTOMER
        ADD     DI,2
        PUSH    SI
        PUSH    DI
        CALL    DPCMP                   ;COMPARE TWO DOUBLE
                                         PRECISION NUMBERS
        CMP     AL,1
        JE      KMO4                    ;CTOT MAX AMT PER CUSTOMER
        MOV     SI,OFFSET CMAMT         ;CHEC AMOUNTS PER MACHINE
        ADD     DI,4
        PUSH    SI
        PUSH    DI
        CALL    DPCMP                   ;COMPARE TWO DOUBLE
                                         PRECISION NUMBERS
        CMP     AL,1
KMOE:   POP     ES                      ;KEYBOARD ERROR
        CALL    KERR                    ;ERROR - CLEAR ENTRY & BEEP

RO Assembler 03-06-84           Page 1-13

KEYBOARD MONITOR PROCEDURE

KMO0:   MOV     MOVP,1                  ;MO/VP INDICATOR
        INC     CONT
        INC     CMONT
        MOV     AL,4
        MUL     BL
        MOV     BX,AX                   ;CAMT & CFEE INDEX
        MOV     AX,KBIN                 ;LOW BYTES OF MO
        MOV     CAMT[BX],AX
        MOV     AX,KBIN+2               ;HIGH BYTES OF MO
        MOV     CAMT[BX],AX
        MOV     AL,FEEC                 ;CHECK IF FEE IS TO BE
                                         COMPUTED
        CMP     AL,0
        JE      KMO3                    ;NO FEE
        PUSH    ES
        MOV     AX,EPRM
        MOV     ES,AX
        MOV     SI,OFFSET KBIN          ;FIND FEE
        MOV     DI,OFFSET FEELMT-9
        MOV     CX,NFEE
KMO1:   ADD     DI,8                    ;$$$ORDER CHANGED$$$
        PUSH    SI
        PSUH    DI                      ;$$$WRONG SEGMENT$$$
        CALL    DPCMP                   ;COMPARE TWO DOUBLE
                                         PRECISION NUMBERS
        CMP     AX,1
        JNE     KMO2                    ;FEE FOUND-MONEY ORDER
                                         $<=$BREAKPOINT
```

```
           LOOP    KMO1              :NEXT FEE
KNO2:      ADD     DI,4              :FEE ADDRESS
           MOV     AX,ES:WORD PTR[DI]
           MOV     CFEE[BX],AX
           ADD     DI,2
           MOV     AX,ES:WORD PTR[DI]
           MOV     CFEE+20BX1,AX
           POP     ES
KMO3:      RET
KMO4:      POP     ES                :AMOUNTS EXCEEDED-SUBTRACT
                                     LAST AMOUNTS
           MOV     SI,OFFSET KBIN
           MOV     DI,OFFSET CTOT
           PUSH    SI
           PUSH    DI
           PUSH    SI
           CALL    DPSUB             :CTOT-CMAMT--AMT ENTERED
           PUSH    ES
           CALL    DPSUB             :CMAMT=CMAMT-AMT ENTERED
           PUSH    ES
           JMP     KMOE              :ERROR
KTRNS:     MOV     AL,KTRNSN         :TRANSMIT KEY
           MOV     SI,OFFSET KTRNSD
           CALL    KINIT             :INITIALIZE KEYBOARD &
                                     DISPLAY VARIABLES
           RET
KDEFN:     MOV     AL,KDEFNN         :DEFINE KEY
           MOV     SI,OFFSET KDEFND
           CAL     KINIT             :INITIALIZE KEYBOARD &
                                     DISPLAY VARIABLES
           MOV     DI,OFFSET CTOT    :ZERO CURRENT TOTAL
           XOR     AX,AX
           STOSW

RO Assembler 03-06-84              Page 1-14
KEYBOARD MONITOR PROCEDURE

STOSW
           MOV     AL,MOVP
           JE      KTOTL6            :DISPLAY OR PRINT TOTALS
           CMP     AL,2
           JE      KTOTL3            :VENDOR PAYMENT TOTAL
           CMP     AL,1
           JE      KTOTL1            :MONEY ORDER TOTAL
           CALL    KERR
           RET
KTOTL1:    MOV     CX,CONT           :MONEY ORDER TOTAL
           MOV     SI,OFFSET CFEE-4
           MOV     DI,OFFSET CTOT
KTOTL2:    ADD     SI,4              :FEE ADDRESS
           PUSH    SI
           PUSH    DI
           CALL    DPADD             :ADD UP ALL FEES
           LOOP    KTOTL2
KTOTL3:    MOV     CX,CCNT           :SUM TOTAL TRANSACTIONS
           AD      CTCNT,CX
           MOV     SI,OFFSET CAMT-4
           MOV     DI,OFFSET CTOT
KTOTL4:    ADD     SI,4
           PUSH    SI
           PUSH    DI
           CALL    DPADD
           LOOP    KTOTL4
           PUSH    DI
           MOV     SI,OFFSET CTAMT
           PUSH    SI
           CALL    DPADD             :SUM MACHINE TOTAL
           MOV     SI,OFFSET MOTMSG  :MO TOT
           CMP     MOVP,1
           JE      KTOTL5
           MOV     SI,OFFSET VPTMSG  :VP TOT
KTOTL5:    MOV     DI,OFFSET DBFR
```

```
                PUSH    DI                      ;DBER ADDRESS FOR DISPLAY
                MOV     CX,7
REP             MOVS    ES:BYTE PTR[DI],CS:[SI]
                MOV     SI,OFFSET CTOT          ;CONVERT TO ASCII & DISPLAY
                MOV     CX,OFFSET SCRTCH
                MOV     AH,9
                MOV     AL,KREAL
                PUSH    SI
                PUSH    DI
                PUSH    CX
                PUSH    AX
                CALL    BNASC                   ;CONVERT TO ASCII
                MOV     AX,SDBFR
                PUSH    AX
                MOV     AX,120H                 ;BLINKING DISPLAY, NO CURSOR
                PUSH    AX
                CALL    DISP                    ;DISPLAY
                RET
KTOTL6:         NOP                             ;TOTAL DISPLAY/REPORTS-$$$NO PROGRAM$$$
                RET
KSHFT:          MOV     SHFT,1                  ;DAY/SHIFT KEY
                RET

RO Assembler 03-06-84              Page 1-15

KEYBOARD MONITOR PROCEDURE

KDISP:          MOV     DSPR,1                  ;DISPLAY KEY - DSPR=1
                RET
KPRNT:          MOV     DSPR,2                  ;PRINT KEY - DSPR=2
                MOV     AL,MOVP
                CMP     AL,0
                JNZ     KPRNT1                  ;MO/VP PRINT
                RET
KPRNT1:         MOV     AL,CKPRS                ;$$$ SECURITY CHECK $$$
                XOR     AL,AL
                JZ      KPRNT2                  ;OK TO PRINT MONEY
                                                 ORDERS/VENDOR PAYMENTS
                RET                             ;PRINTER DISABLED - IGNORE
                                                 PRINT COMMAND
KPRNT2:         NOP                             ;PRINT CHECK - $$$ NO PROGRAM
                                                 $$$
KEYB            ENDP
                SUBTTL          KEYBOARD INITIALIZATION PROCEDURE

PAGE 66,132
NAME            RMOD_PRINT

;       ****************************************************************
;       ***   PRINTER DRIVER FOR RMOD. THIS PROGRAM ACCEPTS STRING  ***
;       ***   DATA AND TRANSFORMS IT INTO A LIST OF 'CELL SPECS     ***
;       ***   WHICH ARE SORTED AND PROCESSED TO GENERATE A LINE AT A ***
;       ***   TIME OF PIXEL DATA TO DRIVE THE FOUR PRINT SOLENOIDS  ***
;       ***   OF A _____ DOT MATRIX PRINTER                     ***
;       ***   THE ALGORITHM IS EXPLAINED IN A SEPARATE DOCUMENT     ***
;       ***   TITLED '_____'                                    ***
;       ****************************************************************

STACK               SEGMENT     PARA    STACK   'STACK'

STACK_BOTTOM        LABEL       WORD
                    ORG         OFFSET $+01FEH
STACK_TOP           LABEL       WORD
STACK               ENDS

DATA                SEGMENT     PARA    MEMORY  'DATA'

NEXT_CELL           LABEL       WORD
```

```
                ORG             OFFSET $+2
TOTAL_CELLS     LABEL           WORD
                ORG             OFFSET $+2
XCOORD          LABEL           WORD
                ORG             OFFSET $+2
YCOORD          LABEL           WORD
                ORG             OFFSET $+2
FONT            LABEL           BYTE
                ORG             OFFSET $+1
DIRECT          LABEL           BYTE
                ORG             OFFSET $+1
WDTH            LABEL           BYTE
                ORG             OFFSET $+1
HEIGHT          LABEL           BYTE
                ORG             OFFSET $+1
HSPACE          LABEL           BYTE
                ORG             OFFSET $+1
VSPACE          LABEL           BYTE
                ORG             OFFSET $+1
IPT_OFFS        LABEL           WORD
                ORG             OFFSET $+2
HORIZ           LABEL           WORD
                ORG             OFFSET $+2
VERT            LABEL           WORD
                ORG             OFFSET $+2
CSPECS_START    LABEL           WORD
                ORG             OFFSET $+2
ACTIVE_CELL_TABLE LABEL         WORD
                ORG             OFFSET $+(2*3*65)
ACTIVE_LIST     LABEL           WORD
                ORG             OFFSET $+2
THIS_ENT        LABEL           WORD
                ORG             OFFSET $+2
NEXT_ENT        LABEL           WORD
                ORG             OFFSET $+2
FREE_LIST       LABEL           WORD
                ORG             OFFSET $+2
BACK            LABEL           WORD
                ORG             OFFSET $+2
FWD             LABEL           WORD
                ORG             OFFSET $+2
NUMBER_ACTIVE   LABEL           BYTE
                ORG             OFFSET $+1
SWAPPED         LABEL           BYTE
                ORG             OFFSET $+1

;       THIS IS THE OUTPUT LINE BUFFER FOR SOLENOID DATA

BUFF            LABEL           BYTE            ; ROOM FOR 16 BYTES
                ORG             OFFSET $+16     ; LAST 2 FOR OVERFLOW

BIT             LABEL           BYTE            ; HOLDS POSITION IN SCANLINE
                ORG             OFFSET $+1
SCANLINE        LABEL           WORD            ; HOLDS CURRENT SCANLINE
                ORG             OFFSET $+2
PR_SHADOW       LABEL           BYTE
                ORG             OFFSET $+1
SOL             LABEL           BYTE            ; HOLDS VAL OF CURRENT
                ORG             OFFSET $+1      ; SOLENOID
INSERTED        LABEL           WORD            ; NUMBER OF CSPECS WHICH
                ORG             OFFSET $+2      ; HAVE BEEN MADE ACTIVE
NXT2CHK         LABEL           WORD            ; OFFSET OF NXT CSPEC
                ORG             OFFSET $+2      ; TO EXAMINE
```

```
;       FOR SIMULATION PURPOSES THIS VARIABLE WILL REPRESENT
;       THE IO PORT WHICH CONTROLS THE PRINTER THIS WILL HAVE
;       TO BE CHANGED TO AN I/O INSTRUCTION WHICH WRITES TO AN
;       IO SEGMENT ADDRESS

PRINT_PORT              LABEL           BYTE
                        ORG             OFFSET $+1

;       TEST DATA- TO BE REMOVED AFTER DEBUGGING IS DONE
;       THIS SPECIFIES 3 STRINGS TO BE PRINTED

STRING_LIST             DB              3                       ;3 STRING DESCRIPTORS
                        DW              OFFSET STRING1
                        DW              OFFSET STRING2
                        DW              OFFSET STRING3

STRING1                 DW              0                       ;X COORDINATE
                        DW              0                       ;Y COORDINATE
                        DB              AFONT                   ;STANDARD FONT
                        DB              DOWN                    ;CHECK ORIENTATION
                        DB              3                       ;CHARACTER COUNT
                        DB              'ABC'                   ;THE STRING

STRING2                 DW              0                       ;X COORDINATE
                        DW              0                       ;Y COORDINATE
                        DB              AFONT                   ;STANDARD FONT
                        DB              RIGHT                   ;RECEIPT ORIENTATION
                        DB              4                       ;NUMBER OF CHARS
                        DB              'TX_J'                  ;THE STRING

STRING3                 DW              25                      ;XCOORDINATE
                        DW              10                      ;Y COORDINATE
                        DB              AFONT                   ;STANDARD FONT
                        DB              LEFT                    ;BACKWARDS DIRECTION
                        DB              2                       ;CHAR COUNT
                        DB              'HI'                    ;THIRD STRING

FREE_SPACE              LABEL           WORD                    ;SHOULD BE ENOUGH SPACE
                        ORG             $+(50*8)                ;FOR 50 CELL SPECS
END_DATA                LABEL           WORD
DATA                    ENDS

;*******************************************************************************
;EQUATES
;*******************************************************************************

MAX_ACTIVE_CELLS        EQU             64
SIZE_OF_ACT             EQU             65
CSPEC_SIZE_IN_BYTES     EQU             8

RIGHT                   EQU             0
LEFT                    EQU             1
UP                      EQU             2
DOWN                    EQU             3

;OFFSETS WITHIN AN ACTIVE CELL TABLE ENTRY.

ACT_CSPEC_INDEX         EQU             0
ACT_BACK_PTR            EQU             2
ACT_FWD_PTR             EQU             4
```

```
;OFFSETS WITHIN A CELL SPEC

CSPEC_SCANLINE          EQU     0
CSPEC_FMEMOFFS          EQU     2
CSPEC_WIDTH             EQU     4
CSPEC_HEIGHT            EQU     5
CSPEC_XBYTEOFFS         EQU     6
CSPEC_XBITOFFS          EQU     7

;OFFSETS WITHIN A FONT DESCRIPTOR

FDESC_WIDTH             EQU     0
FDESC_HEIGHT            EQU     1
FDESC_HSPACE            EQU     2
FDESC_VSPACE            EQU     3
FDESC_IPTOFFS           EQU     4

;OFFSETS WITHIN A STRING DESCRIPTOR

STDESC_XCOORD           EQU     0
STDESC_YCOORD           EQU     2
STDESC_FONT             EQU     4
STDESC_DIRECT           EQU     5
STDESC_COUNT            EQU     6
STDESC_CHARS            EQU     7

MAX_SCANS               EQU     700     ;NUM SCANLINES PER MONEY ORDR
BITS_PER_SCAN           EQU     240     ;WIDTH OF ONE SCANLINE IN DOTS

;EQUATES USED WITH PRINT SHADOW REGISTER    PR_SHADOW

SOL1                    EQU     01H
SOL2                    EQU     02H
SOL3                    EQU     04H
SOL4                    EQU     08H
NOT_SOLENOIDS           EQU     0F0H
MTRDRV                  EQU     010H
NOT_MTRDRV              EQU     0EFH
MTRSTP                  EQU     020H
NOT_MTRSTP              EQU     0DFH
CLAMP_ON                EQU     080H
CLAMP_OFF               EQU     07FH

AFONT                   EQU     0
BFONT                   EQU     1

CODE                    SEGMENT WORD    PUBLIC 'CODE'

ASSUME  CS:CODE
        ASSUME  DS:DATA
        ASSUME  SS:STACK

;*******************************************************************************
; DRIVER ROUTINE :    THIS IS FOR DEBUGGING-SHOULD COME OUT LATER
;*******************************************************************************

TEST_STARTS:    MOV     AX,DATA
                MOV     DS,AX

MOV     AX,STACK            ;SET UP STACK SEG
                MOV     SS,AX
                MOV     SP,OFFSET STACK_TOP ;SET UP STK PTR
```

```
                        MOV         DX,OFFSET FREE_SPACE
                        MOV         BX,OFFSET STRING_LIST
                        CALL        PRNTR
TEST_DONE:              JMP         TEST_DONE
```

;****************************************************************************

;END OF DEBUGGING CODE
;****************************************************************************

;****************************************************************************
;
;   THIS IS THE MAIN ENTRY POINT FOR THE WHOLE PRINTER DRIVER
;   PRNTR EXPECTS TWO PARAMETERS:
;
;           1. THE OFFSET OF THE STRING LIST TABLE SHOULD BE IN BX reg
;
;           2. THE OFFSET OF UNRESTRICTED WORKSPACE ABOVE ALL STRINGS
;              AND OTHER DATA SHOULD BE IN DX reg
;
;****************************************************************************

```
PRNTR:          ;       PUSHA    ***** 80186 INST. ;SAVE ALL REGISTERS -
                                                   ; REPLACED BY THE FOLLOWING
                        PUSH        AX
                        PUSH        BX
                        PUSH        CX
                        PUSH        DX
                        PUSH        DS
                        PUSH        ES
                        PUSH        SS
                        PUSH        DI
                        PUSH        SI
                        PUSH        BP

MOV         AX,DATA         ;SET UP SEGMENT REGISTER
                        MOV         DS,AX
```

;       GET THE OFFSET OF UNRESTRICTED WORKSPACE IN WHICH WE MAY
;       BUILD THE TABLES. CALLER SHOULD SUPPLY THIS IN DX REGISTER

```
                        MOV         NEXT_CELL,DX    ;OFFSET OF FREE AREA IN DATA SEGMENT
                                                    ; FOR TABLES
                        MOV         TOTAL_CELLS,0   ;COUNTER FOR CELL SPECS
                        MOV         CSPECS_START,DX ;SAVE ORIGIN OF CELL SPEC TABLE.

SUB         CX,CX
```

;       BX HOLDS OFFSET IN DATA SEGMENT OF STRING LIST

```
                        MOV         CL,[BX]         ;GET NUMBER OF STRINGS TO PROCESS
                        INC         BX              ;BX HOLDS OFFSET OF WORD HOLDING
                                                    ;OFFSET OF FIRST STRING IN LIST
;       CHECK FOR ZERO STRINGS
                        CMP         CL,0
                        JG          DO_A_STRING
                        JMP         LISTS_DONE
```

;****************************************************************************

```
; PROCESS EACH STRING IN THE STRING LIST. BX HOLDS THE OFFSET OF THE FIRST
; ENTRY IN THE STRING LIST TABLE. CL HOLDS THE NUMBER OF STRINGS TO PROCESS
; CSPECS_START HOLDS THE OFFSET OF THE AREA WHERE THE CELL SPECS WILL BE
; BUILT AND SORTED.
;********************************************************************

DO_A_STRING:    MOV     DX,[BX]                 ;DX HOLDS OFFSET OF NEXT STRING DESC
                INC     BX                      ;MAKE BX POINT TO WORD HOLDING
                INC     BX                      ;OFFSET OF NEXT STRING DESC AND
                PUSH    BX                      ;SAVE ON STACK FOR NEXT LOOP

;       NOW LOAD PARAMETERS FOR CURRENT STRING

MOV     BX,DX                   ;OFFSET OF CURRENT STRING DESC
                MOV     AX,[BX+STDESC_XCOORD]
                MOV     XCOORD,AX

MOV     AX,[BX+STDESC_YCOORD]
                MOV     YCOORD,AX

MOV     AL,[BX+STDESC_FONT]
                MOV     FONT,AL

MOV     AL,[BX+STDESC_DIRECT]
                MOV     DIRECT,AL

PUSH    BX                      ;SAVE WHILE DOING NEXT

SUB     BX,BX                   ;MULTIPLY FONT BY 6
                MOV     BL,FONT                 ;TO MAKE IT AN INDEX
                SHL     BX,1                    ;INTO THE FONT_SPEC_TABLE
                MOV     DX,BX
                SHL     BX,1
                ADD     BX,DX

;NOW GET THE PARAMETERS FOR THE FONT REQUESTED

ADD     BX,OFFSET FONT_SPEC_TABLE

MOV     AL,CS:[BX+FDESC_WIDTH]
                MOV     WDTH,AL  ; WIDTH IN BYTES

MOV     AL,CS:[BX+FDESC_HEIGHT]
                MOV     HEIGHT,AL ; HEIGHT IN BITS

MOV     AL,CS:[BX+FDESC_HSPACE]
                MOV     HSPACE,AL

MOV     AL,CS:[BX+FDESC_VSPACE]
                MOV     VSPACE,AL

MOV     AX,CS:[BX+FDESC_IPTOFFS]
                MOV     IPT_OFFS,AX

;NOW INITIALIZE CUMULATIVE POSITIONERS

MOV     HORIZ,0
                MOV     VERT,0

POP     BX ; RESTORE OFFSET OF CURRENT STRING DESCRIPTOR
                PUSH    CX ; SAVE STRING COUNTER
```

```
                    ;SET UP REGISTERS TO LOOP THROUGH CHARACTERS OF CURRENT STRING

MOV         SI,NEXT_CELL
                         ADD         BX,STDESC_COUNT   ;BX IS OFFSET OF CHARACTER COUNT
                         SUB         CH,CH
                         MOV         CL,[BX]           ;LOOP COUNT = NUMBER OF CHARS

DO_A_CHAR:       INC         BX                ;POINT TO CURRENT CHAR
                         SUB         AX,AX
                         MOV         AL,[BX]           ;GET THE CHAR
                         PUSH        BX                ;SAVE PTR FOR NEXT LOOP
                         SHL         AX,1
                         ADD         AX,IPT_OFFS       ;POINT TO IPT ENTRY FOR CHAR
                         MOV         BX,AX
                         MOV         AX,CS:[BX]        ;GET FONT MEM OFFSET FOR CHAR

;NOW BUILD THE CELL SPEC POINTED TO BY SI REG

MOV         [SI+CSPEC_FMEMOFFS],AX  ;FMEM OFFSET

MOV         AX,YCOORD
                         ADD         AX,VERT
                         MOV         [SI+CSPEC_SCANLINE],AX  ;CHAR ORIGIN SCANLINE

MOV         AX,XCOORD
                         ADD         AX,HORIZ
                         MOV         DX,AX
                         AND         AX,0007H
                         MOV         [SI+CSPEC_XBITOFFS],AL  ;CHAR ORIGIN BIT REMAINDER

SHR         DX,1
                         SHR         DX,1
                         SHR         DX,1
                         MOV         [SI+CSPEC_XBYTEOFFS],DL ;CHAR ORIGIN MOD BYTE

MOV         AL,WIDTH
                         MOV         [SI+CSPEC_WIDTH],AL     ;CHAR WIDTH IN BYTES

MOV         AL,HEIGHT
                         MOV         [SI+CSPEC_HEIGHT],AL    ;CHAR HEIGHT IN BITS

;****************************************************************
; NOW CHECK DIRECTION TO COMPUTE CUMULATIVE POSITIONERS FOR NEXT
; CHARACTER THE DRAWING SHOWS THE PRINT ORIENTATIONS
;****************************************************************
```

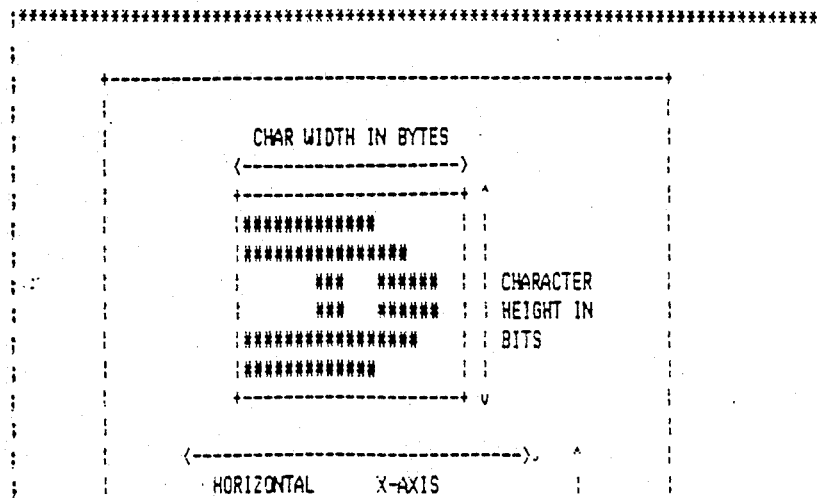

```
;                         UP              VERTICAL
;                                          Y-AXIS
;
;             LEFT -----+----- RIGHT           v
;                       |
;                       |
;                      DOWN
;
;     +----------------------------------------------+
;     |                                              |
;     |                  PRINTER                     |
;     |                                              |
;     +----------------------------------------------+
;
;
;     NORMAL ORIENTATION FOR CHECK PRINTING IS "DOWN"
;
;     NORMAL ORIENTATION FOR RECEIPTS WOULD BE "RIGHT"
;
;
;                         #####...   ^  ^
;   FONT0:                ..#..#..   |  |
;                         ..#...#.   5  |
;   Letter "A"            ..#...#.   |  7    CHAR WIDTH IN BYTES   = 1
;                         #####...   v  |    CHAR HEIGHT IN BITS   = 5
;                                       |    HORIZ SPACING IN BITS = 10
;                                       ^    VERT SPACING IN BITS  = 7
;                         <------>
;                          1 BYTE
;
;                         <-- 10 -->
;
;***********************************************************************

SUB          AX,AX

TRY_RIGHT:               CMP          DIRECT, RIGHT   ;NORMAL, SO TRY THIS FIRST TO SAVE TIME
                         JNE          TRY_UP          ;NOT RIGHT- GO ON
DO_RIGHT:                MOV          AL,HSPACE       ;NORMAL ORIENTATION ON A RECEIPT
                         ADD          HORIZ,AX        ;NEXT CHAR IN THIS STRING WILL BE PLACED
                         JMP          CSPEC_DONE      ;THIS CHARACTER'S HORIZONTAL SPACING
                                                      ;TO THE RIGHT OF THIS CAHRACTER
TRY_UP:                  CMP          DIRECT,UP
                         JNE          TRY_LEFT
DO_UP:                   MOV          AL,VSPACE       ;NEXT CHAR WILL BE PLACED THIS
                         SUB          VERT,AX         ;CHARS VERTICAL SPACING ABOVE
                         JMP          CSPEC_DONE      ;THIS CHARACTER

TRY_LEFT:                CMP          DIRECT,LEFT     ;UPSIDE DOWN & BACKWARDS PRINTING
                         JNE          DO_DOWN
DO_LEFT:                 MOV          AL,HSPACE       ;NEXT CHAR WILL BE PLACED THIS
                         SUB          HORIZ,AX        ;CHAR'S HORIXONTAL SPACING TO THE
                         JMP          CSPEC_DONE      ;LEFT OF THIS CHARACTER

DO_DOWN:                 MOV          AL,VSPACE       ;NEXT CHAR WILL BE PLACED THIS
                         ADD          VERT,AX         ; CHAR'S VERTICAL SPACING BELOW
                                                      ;THIS CHARACTER. NORMAL
                                                      ; ORIENTATION FOR CHECK
```

```
CSPEC_DONE:         ADD         SI,CSPEC_SIZE_IN_BYTES
                    INC         TOTAL_CELLS
                    POP         BX                      ;RESTORE OFFSET OF
                    DEC         CX                      ;THIS CHAR IN
                    JZ          STRING_DONE             ;STRING DESCRIPTOR
                    JMP         DO_A_CHAR

STRING_DONE:        POP         CX                      ;RESTORE STRING LOOP CTR
                    POP         BX                      ;RESTORE OFFSET OF
                    MOV         NEXT_CELL,SI            ;SAVE THE OFFSET
                    DEC         CX                      ;NEXT SLOT IN STRING
                    JZ          SORT_CSPECS             ;TABLE
                    JMP         DO_A_STRING

;*****************************************************************
; IN-PLACE BUBBLE SORT OF CSPEC LIST INTO ASCENDING ORDER BASED ON
; CONTENTS OF 1ST WORD IN EACH CELL SPEC
;*****************************************************************

SORT_CSPECS:        MOV         CX,TOTAL_CELLS
                    DEC         CX                      ;OUTER LOOP IS DONE n - 1 TIMES
I_LOOP:             PUSH        CX                      ;SAVE OUTER LOOP COUNTER

MOV         BX,CSPECS_START         ;BEGINNING OF TABLE TO SORT
                    MOV         SWAPPED,0               ;SET FLAG CLEAR FOR NEXT INNER LOOP
                    MOV         CX,TOTAL_CELLS          ;INNER LOOP IS DONE n - 2
                    SUB         CX,2                    ;TIMES
J_LOOP:             PUSH        CX                      ;SAVE INNER LOOP COUNTER
                    MOV         AX,[BX]                 ;COMPARE ACT_CSPEC_INDICES FOR
                    CMP         AX,[BX+8]               ;TWO ADJACENT CELLS. IF OUT OF
                    JNG         NO_SWAP                 ;ORDER, THEN SWAP THEIR CONTENTS
SWAP:               PUSH        CX                      ;SAVE INNER LOOP COUNTER
                    MOV         CX,CSPEC_SIZE_IN_BYTES/2 ;LOOP HERE ONCE FOR EACH
                                                        ;WORD IN A CELL SPEC
SWAP_LOOP:          MOV         AX,[BX]                 ;GET THE WORDS TO SWAP
                    MOV         DX,[BX+8]
                    MOV         [BX],DX                 ;PUT THEM BACK IN SWAPPED
                    MOV         [BX+8],AX               ;POSITIONS
                    ADD         BX,2
                    LOOP        SWAP_LOOP

POP         CX

MOV         SWAPPED,1               ;SET FLAG SAYING AT LEAST ONE SWAP
                                                        ;IN THRU INNER LOOP
                    JMP         NEXT_J

NO_SWAP:            ADD         BX,8                    ;ADJUST POINTER UP ONE CELLSPEC

NEXT_J:             POP         CX                      ;RESTORE INNER LOOP COUNTER

LOOP        J_LOOP

CMP         SWAPPED,0               ;IF FLAG WAS SET, SWAPS WERE MADE
                    JNE         NOT_DONE                ;AND WE ARE NOT DONE
                    POP         CX                      ;BUT IF FLAG WAS NOT SET,
                                                        ;RESTORE STACK
                    JMP         LISTS_DONE              ;AND GET OUT OF SORT ROUTINE

NOT_DONE:           POP         CX                      ;RESTORE OUTER LOOP COUNTER
                    LOOP        I_LOOP
```

```
;****************************************************************
; CELL SPEC LIST IS SORTED AND READY TO PROCESS SEQUENTIALLY
; NOW FIRE UP THE PRINTER, BUILD SCANLINES, AND PRINT IT ALL
;****************************************************************

LISTS_DONE:         CALL        REL_CLAMP       ; RELEASE PAPER CLAMP
                    CALL        ACT_INIT        ; INITIALIZE ACTIVE LIST
                    MOV         SCANLINE,0
                    MOV         SOL, 01H        ; READY FIRST SOLENOID
                    MOV         INSERTED, 0
                    MOV         AX, CSPECS_START
                    MOV         NXT2CHK,AX
                    CALL        SOLENOIDS_OFF   ; RELEASE ANY SOLENOIDS THAT
                                                ; MIGHT INADVERTENTLY BE ON
                    CALL        MOTOR_ON        ; START MOVING PAPER

;****************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND DUMP IT EVERY TIME THEREAFTER THAT A PRINT CLOCK SIGNAL IS
; DETECTED.
;****************************************************************

WAIT4RST:           CALL        PRTST
                    AND         AL,AL
                    JZ          WAIT4RST

;****************************************************************
; CHECK NOW TO DETERMINE WHETHER ALL SCANLINES HAVE BEEN MADE
; AND, IF SO, QUIT AND TURN OFF THE MOTOR BEFORE RETURNING
;****************************************************************

WEHAVERST:          CMP         SCANLINE, MAX_SCANS
                    JE          CHECK_PRINTED

CALL        BUILD_NXT_SCAN
                    MOV         BIT,0;

;****************************************************************
; WAIT TILL PRINT CLOCK HAS BEEN ASSERTED
;****************************************************************

WAIT4CLK:           CALL        PRTST
                    AND         AH,AH
                    JZ          WAIT4CLK

;       CHECK WHETHER ALL BITS IN THE SCANLINE HAVE BEEN ACCOUNTED FOR

WEHAVECLK:          CMP         BIT,BITS_PER_SCAN
                    JNE         DO_DE_BIT
                    INC         SCANLINE
                    JMP         WAIT4RST

; TURN OFF THE LAST SOLENOID BY TURNING OFF ALL OF THEM
; THEN FIND THE STATE OF THE CURRENT BIT AND, IF TRUE,
; FIRE PROPER SOLENOID

DO_DE_BIT:          AND         PR_SHADOW, 0F0H ; OFF ALL SOLENOIDS

CALL        ISOLATE_BIT     ; TEST BIT "BIT"
                    AND         AL,AL           ; TEST VALUE PUT HERE
                                                ; BY ISOLATE_BIT
                    JZ          DONT_FIRE
```

; WE WILL FIRE THE NEXT SOLENOID THIS TIME

```
FIRE_ONE:       MOV     DL,SOL
                OR      PR_SHADOW,DL
```

;       WE MAY OR MAY NOT HAVE ORED A SOLENOID BIT INTO THE SHADOW AT THIS POINT

```
DONT_FIRE:      INC     BIT             ; POINT TO NEXT BIT
                CMP     SOL,SOL4        ; IF TRUE RESET TO SOL1
                JE      SOL_IS_8
SOL_NOT_8:      SHL     SOL,1           ; OTHERWISE SET NXT SOL
                JMP     WRITE_SHADOW
SOL_IS_8:       MOV     SOL,SOL1        ; RESETS SOL TO SOL1
```

; WRITE THE VALUE IN THE SHADOW REGISTER TO THE OUTPUT PORT

```
WRITE_SHADOW:   MOV     AL, PR_SHADOW
                MOV     PRINT_PORT,AL
```

; NOW WAIT FOR THE NEXT PRINT CLOCK

```
                JMP     WAIT4CLK
```

; THE LAST SCANLINE SHOULD HAVE BEEN PRINTED.
; NOW TURN OFF THE MOTOR AND ALL SOLENOIDS AND RETURN

```
CHECK_PRINTED:  CALL    MOTOR_OFF;
                CALL    SOLENOIDS_OFF
```

; NOW ALL DONE PRINTING, RETURN TO THE ROUTINE THAT CALLED PRNTR

```
;       POPA    **** 80186 INST.        ; RESTORE ALL REGISTERS REPLACED BY
                                        ; THE FOLLOWING

POP     BP
                POP     SI
                POP     DI
                POP     SS
                POP     ES
                POP     DS
                POP     DX
                POP     CX
                POP     BX
                POP     AX

RET
```

;ROUTINES FOR MANAGING THE ACTIVE CELL LIST

;INITIALIZING THE ACTIVE CELL LIST

```
ACT_INIT:       MOV     BX,OFFSET ACTIVE_CELL_TABLE
                MOV     CX,SIZE_OF_ACT
                MOV     AX,01H
```

```
INIT_ACT:           MOV         [BX+ACT_FWD_PTR],AX     ;LINK EACH ENTRY BY
                    INC         AX                       ;MAKING EACH FORWARD
                    ADD         BX,6                     ;POINTER POINT TO THE
                    LOOP        INIT_ACT                 ;NEXT ENTRY IN THE LIST

MOV         FREE_LIST,0              ;FREE LIST STARTS WITH 0th ENTRY
                    MOV         NUMBER_ACTIVE,0          ;ACTIVE LIST IS NULL
                    MOV         ACTIVE_LIST,0FFFFH
                    RET                                  ;ALL DONE

;INSERTING A CELL SPEC INTO THE ACTIVE CELL LIST
;AX HOLDS INDEX INTO SORTED LIST OF CELL SPECS
;ALGORITHM IS:
;       OLD_ACTIVE = ACTIVE_LIST
;       ACTIVE_LIST = FREE_LIST
;       FREE_LIST = FREE_LIST(4)
;
;       ACTIVE_ENTRY(CSPINDX) = CELL SPEC INDEX
;       ACTIVE_ENTRY(BKPTR) = NULL    (THIS IS BACK PTR OF 1ST IN NEW ACT LIST)
;       ACTIVE_ENTRY(FWDPTR) = OLD_ACTIVE
;       IF OLD_ACTIVE NOT NULL THEN
;               OLD_ACTIVE ENTRY(BKPTR) = ACTIVE_LIST

INSERT_INTO_ACT:
                    CMP         NUMBER_ACTIVE,MAX_ACTIVE_CELLS
                    JAE         TOO_MANY_INSERTS
;       MAKE OLD_ACT = ACTIVE_LIST CX USED TO HOLD OLD_ACTIVE
                    MOV         DX,ACTIVE_LIST
                    MOV         CX, DX

;       ACTIVE_LIST = FREE_LIST
                    MOV         SI, FREE_LIST
                    MOV         ACTIVE_LIST,SI

;       FREE_LIST = FORMER 2ND ENTRY IN FREE LIST. MULTIPLY INDEX BY 6
                    SHL         SI,1
                    MOV         DI,SI
                    SHL         SI,1
                    ADD         SI,DI
                    MOV         BX, OFFSET ACTIVE_CELL_TABLE
                    MOV         DI, [BX+SI+ACT_FWD_PTR]
                    MOV         FREE_LIST, DI

;       SI STILL POINTS TO OFFSET OF NEW ACTIVE ENTRY
;       FIX UP THREE ENTRIES IN NEWLY ACTIVE CELL
                    MOV         [BX+SI+ACT_CSPEC_INDEX], AX  ; INDEX OF CSPEC BEING ADDED
                    MOV         WORD PTR [BX+SI+ACT_BACK_PTR],0FFFFH
                    MOV         AX, CX
                    MOV         [BX+SI+ACT_FWD_PTR],AX
                    CMP         AX,0FFFFH
                    JE          BUMP_ACTIVES

;       OLD_ACTIVE WAS NOT NULL, SO LINK ITS BACK PTR TO THE NEW HEAD OF ACTIVES
;       AX HOLDS OLD_ACTIVE. MULTIPLY IT BY 6
                    SHL         AX,1
                    MOV         SI,AX
                    SHL         SI,1
                    ADD         SI,AX
                    MOV         AX,ACTIVE_LIST
                    MOV         [BX+SI+ACT_BACK_PTR],AX
```

```
BUMP_ACTIVES:         INC         NUMBER_ACTIVE
TOO_MANY_INSERTS:     RET

;ROUTINE TO REMOVE EXHAUSTED CELL SPEC FROM ACTIVE LIST
;AND RETURN ITS SLOT TO FREE LIST. AX HOLDS INDEX INTO ACTIVE CELL TABLE OF;
;ENTRY TO BE REMOVED

REMOVE_FROM_ACT:
                      CMP         NUMBER_ACTIVE,0           ;IF NONE,WE HAVE
                                                            ;A PROBLEM
                      JG          OK_TO_REMOVE
                      JMP         TOO_MANY_REMOVALS
OK_TO_REMOVE:         MOV         BX,OFFSET ACTIVE_CELL_TABLE   ;HEAD OF TABLE
                      MOV         SI,AX                     ;MULTIPLY INDEX BY 6
                      SHL         SI,1                      ;TO MAKE IT A BYTE
                      MOV         CX,SI                     ;INDEX INTO THE ACT
                      SHL         SI,1
                      ADD         SI,CX
                      MOV         DX,[BX+SI+ACT_BACK_PTR]   ;SAVE THIS
                      MOV         BACK,DX

MOV         DX,[BX+SI+ACT_FWD_PTR]            ;AND THIS
                      MOV         FWD,DX

MOV         DX,FREE_LIST              ;LINK THIS ENTRY INTO
                      MOV         [BX+SI+ACT_FWD_PTR],DX

MOV         FREE_LIST,AX              ;FREE LIST AHEAD OF ALL OTHERS
                      CMP         BACK,0FFFFH               ;WAS HEAD OF ACT HOLDING
                      JNE         NOT_FIRST                 ;THE FIRST ENTRY IN FREE LIST
FIRST:                MOV         AX,FWD                    ;YES, IT WAS
                      MOV         ACTIVE_LIST,AX            ;ACTIVE NOW POINTS TO WHAT
                                                            ;THIS ENTRY USED TO POINT TO
                      MOV         SI,AX                     ;MAKE THIS INTO BYTE INDEX
                      SHL         SI,1
                      MOV         CX,SI
                      SHL         SI,1
                      ADD         SI,CX
                      MOV         WORD PTR [BX+SI+ACT_BACK_PTR],0FFFFH
                                                            ;MAKE SUCESSOR'S
                                                            ;BACK PTR NULL
                                                            ;BECAUSE IT IS NEW HEAD
                                                            ;OF ACTIVE LIST
                      DEC         NUMBER_ACTIVE             ;ALL DONE
                      RET

NOT_FIRST:            CMP         FWD,0FFFFH                ;IS ENTRY TO BE REMOVED IN MIDDLE
                      JNE         MIDDLE
LAST:                 MOV         SI,BACK                   ;NO, IT IS LAST IN LIST
                      SHL         SI,1
                      MOV         CX,SI                     ;MAKE THE PREDECESSOR'S
                      SHL         SI,1                      ;FORWARD
                      ADD         SI,CX                     ;POINTER
                      MOV         WORD PTR [BX+SI+ACT_FWD_PTR],0FFFFH
                                                            ;NULL FWD PTR BECAUSE LAST
                      DEC         NUMBER_ACTIVE
                      RET                                   ;ALL DONE

MIDDLE:               MOV         SI,FWD                    ;CELL TO BE REMOVED IS
```

```
                        SHL         SI,1                ;SOMEWHERE IN THE MIDDLE
                        MOV         CX,SI
                        SHL         SI,1                ;MAKE PREDECESSOR'S
                        ADD         SI,CX               ;FWD POINTER
                        MOV         AX,BACK             ;POINT TO SUCESSOR
                        MOV         [BX+SI+ACT_BACK_PTR],AX
                        MOV         SI,AX               ;AND MAKE
                        SHL         SI,1                ;SUCESSOR'S
                        MOV         CX,SI               ;BACK PTR
                        SHL         SI,1                ;POINT TO
                        ADD         SI,CX               ;PREDECESSOR
                        MOV         AX,FWD
                        MOV         [BX+SI+ACT_FWD_PTR],AX
                        DEC         NUMBER_ACTIVE
TOO_MANY_REMOVALS:      RET                             ;ALL DONE

;
; ROUTINE TO DETERMINE THE STATE OF A BIT IN THE SCANLINE BUFFER

ISOLATE_BIT:            SUB         BX,BX               ; CLEAR THIS REGISTER
                        MOV         BL,BIT              ; GET INDEX OF BIT IN
                                                        ;   SCANLINE BUFFER
                        MOV         DL,BL               ; SAVE IT TEMPORARILY
                        MOV         CX,3                ; FOR DIVIDE BY 8 TO GET
                        SHR         BX,CL               ;   BYTE INDEX OF BUFF
                        AND         DL,7                ; FIND BIT REMAINDER
                        INC         DL                  ; FOR BITS TO SHIFT OUT
                        ADD         BX,OFFSET BUFF      ; POINT TO BYTE IN MEM
                        MOV         AL,[BX]             ; READ BYTE OF BUFF
                        MOV         CL,DL               ; SHIFT COUNT
                        SHL         AL,CL               ; SHIFT DESIRED BIT OUT
                                                        ; TO CARRY FLAG
                        JC          SET_BIT             ; IF CARRY THEN BIT = T
                        SUB         AX,AX               ; CLR AX IF BIT FALSE
                        RET
SET_BIT:                MOV         AX,1                ; SET AX IF BIT TRUE
                        RET

; ROUTINE TO TURN OFF ALL FOUR SOLENOIDS

SOLENOIDS_OFF:          AND         PR_SHADOW, NOT_SOLENOIDS
                        MOV         AL, PR_SHADOW
                        MOV         PRINT_PORT, AL
                        RET

; ROUTINE TO TURN MOTOR ON

MOTOR_ON:               OR          PR_SHADOW, MTRDRV
                        AND         PR_SHADOW, NOT_MTRSTP
                        MOV         AL, PR_SHADOW
                        MOV         PRINT_PORT,AL
                        RET

; ROUTINE TO TURN MOTOR OFF

MOTOR_OFF:              OR          PR_SHADOW, MTRSTP
                        AND         PR_SHADOW, NOT_MTRDRV
```

```
                    MOV         AL, PR_SHADOW
                    MOV         PRINT_PORT, AL
                    RET

; ROUTINE TO REMOVE ALL POWER FROM MOTOR

MTR_PWR_OFF:        AND         PR_SHADOW, NOT_MTRSTP
                    AND         PR_SHADOW, NOT_MTRDRV
                    MOV         AL, PR_SHADOW
                    MOV         PRINT_PORT, AL
                    RET

; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

FIRE_SOLENOID:      AND         PR_SHADOW, NOT_SOLENOIDS
                    MOV         AL, SOL
                    OR          PR_SHADOW, AL
                    MOV         PRINT_PORT, AL
                    RET

; ROUTINE TO SET THE STATE OF THE PAPER CLAMP TRUE, TO HOLD THE PAPER

SET_CLAMP:          OR          PR_SHADOW, CLAMP_ON
                    MOV         AL, PR_SHADOW
                    MOV         PRINT_PORT, AL
                    RET

; ROUTINE TO RELEASE THE PAPER CLAMP

REL_CLAMP:          AND         PR_SHADOW, CLAMP_OFF
                    MOV         AL, PR_SHADOW
                    MOV         PRINT_PORT, AL
                    RET

;************************************************************************
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;************************************************************************

;       FIRST, CLEAR OUT THE OLD BUFFER SO ALL NEW DATA MAY BE ORED IN

BUILD_NXT_SCAN:
                    MOV         CX,08H    ; NUMBER OF WORDS TO CLEAR
                    SUB         AX,AX     ; CLEAR THIS TO ZERO
                    MOV         BX, OFFSET BUFF
CLR_BUFF:           MOV         [BX], AX;
                    INC         BX
                    INC         BX
                    LOOP        CLR_BUFF

;    NEXT FIND ANY NEW ACTIVE CELL SPECS TO INSERT INTO THE ACTIVE LIST
;    CHECK WHETHER ALL CSPECS HAVE BEEN MADE ACTIVE BY THIS TIME
```

```
CHECK4INSRT:        MOV         DX, INSERTED
                    CMP         DX, TOTAL_CELLS
                    JE          PROCESS_ACT

;       IF THEY HAVE NOT ALL BEEN PLACED INTO ACT THEN CHECK TO SEE IF ANY
;       WILL GO INTO ACT FOR THIS SCANLINE

MOV         BX, NXT2CHK         ; OFFS OF NXT CSPEC TO CHECK
                    MOV         AX,[BX]             ; AX NOW HAS SCANLINE
                    CMP         AX,SCANLINE         ; IS IT = CURRENT SCANLINE?
                    JNE         PROCESS_ACT         ; IF NOT, NO INSERTS

;       NOW INSERT CELLS INTO ACT WHILE THEIR SCANLINES ARE
;       EQUAL TO CURRENT SCANLINE

INSERT_CELL:        MOV         AX,BX               ; OFFS OF CSPEC TO INSERT
                    INC         INSERTED            ; INDEX OF CSPEC TO GO IN
                    CALL        INSERT_INTO_ACT
                    ADD         NXT2CHK, CSPEC_SIZE_IN_BYTES
                    JMP         CHECK4INSRT

;       NOW PROCESS ALL ACTIVE CELLS FIRST CECK WHETHER ANY ARE ACTIVE

PROCESS_ACT:        CMP         NUMBER_ACTIVE,0
                    JG          SOME_R_ACTV
                    RET                             ; BECAUSE NONE R ACTIVE

SOME_R_ACTV:        MOV         SI,ACTIVE_LIST      ; INDX OF ACT OF 1ST ENT
                    MOV         NEXT_ENT,SI         ; IS NEXT TO LOOK AT
NEXT_CSPEC:         MOV         SI,NEXT_ENT         ; NEXT IS CURRENT
                    MOV         THIS_ENT,SI         ;   ONE TO LOOK AT
                    SHL         SI,1                ; MAKE THIS_ENT AN INDX
                    MOV         DI,SI
                    SHL         SI,1
                    ADD         SI,DI
;       SAVE INDEX IN ACT OF NEXT ENTRY TO CHECK, MAY BE FFFF IF NO MORE

MOV         BX,OFFSET ACTIVE_CELL_TABLE
                    MOV         DX,[BX+SI+ACT_FWD_PTR] ; LINK TO NXT ACTIVE CELL
                    MOV         NEXT_ENT,DX

;       NOW GET OFFSET OF CSPEC TO EXAMINE FIRST; BX STILL HAS OFFSET OF ACT

MOV         BX,[BX+SI]          ; CSPEC OFFSET IN SORTED TABLE

;       PROCESS ONE CELL SPEC

MOV         DI,[BX+CSPEC_XBYTEOFFS]
                    AND         DI, 00FFH           ; WE ONLY WANT BYTE IN LOW
                                                    ; HALF OF DI REG
                    MOV         SI,[BX+CSPEC_FMEMOFFS]
                    SUB         CX,CX
                    MOV         CL,[BX+CSPEC_WIDTH]
                    SUB         DX,DX               ; CLEAR SAVE REGISTER
ONE_CELL:           SUB         AX,AX               ; CLEAR WORK REGISTER
                    MOV         AH, CS:[SI]         ; READ A BYTE OF FONT MEM
                                                    ; FROM CODE SEGMENT
                    PUSH        CX
                    MOV         CL,[BX+CSPEC_XBITOFFS]
                    SHR         AX,CL               ; ALIGN WITH SCANLINE
                                                    ; BIT OFFSET
```

```
                POP       CX              ; RESTORE WIDTH LOOP CTR
                OR        AH,DH           ; OR IN SAVED BITS FROM
                                          ; PREVIOUS BYTE
                MOV       BP, OFFSET BUFF
                OR        DS:[BP+DI],AH   ; OR DATA INTO SCANLINE
                MOV       DH,AL           ; SAVE BITS SHIFTED OUT
                INC       DI              ; INC SCANLINE BYTE INDEX
                INC       SI              ; INC FONT MEM INDEX
                LOOP      ONE_CELL
;       NOW IF DH NOT ZERO THEN THERE WAS DATA SHIFTED OUT OF AX WHICH MUST
;       ALSO BE ORED INTO THE SCANLINE. THE BYTE OFFSET IN DI HAS BEEN INCREMENTED
;       SO JUST OR IN DH RATHER THAN AH

OR        DS:[BP+DI],DH

MOV       [BX+CSPEC_FMEMOFFS],SI
                                          ; UPDATE FONT MEM OFFSET
                DEC       BYTE PTR [BX+CSPEC_HEIGHT]
                JNZ       GETNXTCSPC
                MOV       AX,THIS_ENT
                CALL      REMOVE_FROM_ACT
GETNXTCSPC:     CMP       NEXT_ENT, 0FFFFH
                JNE       NEXT_CSPEC

NO_MORE_ACTV:   RET                       ; ALL ACTIVE CELLS PROCESSED
```

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. A money order dispenser for dispensing money orders at a retail establishment comprising:
   a digital processor for controlling the operation of the dispenser;
   a keyboard connected to the digital processor for entering transaction data, control data for managing the operation of the dispenser, a first security code authorizing access to the dispenser to enable entry of said control data, and a second security code authorizing the printing of a money order;
   a display connected to the digital processor for displaying the transaction and control data entered on the keyboard;
   a memory associated with the digital processor for storing the transaction data and control data;
   a printer controlled by said digital processor for receiving a money order and printing alphanumeric indicia thereon;
   means for detecting entry of the first and second security codes via the keyboard;
   control means responsive to the detecting means for inhibiting entry of the control data via the keyboard when the first security code is not properly entered on the keyboard and for inhibiting operation of the dispenser when the second security code is not properly entered on the keyboard; and
   said money orders having a relatively long longitudinal side and a relatively short transverse side and having indicia pre-printed on the longitudinal side, said printer including a dot matrix printer extending across said transverse side of said money orders for receiving the money orders and printing said alphanumeric indicia thereon.

2. The money order dispenser of claim 1 further including control means for controlling said dot matrix printer to change the orientation of said alphanumeric indicia such that said money orders are produced in a readable form.

3. A money order dispenser for dispensing money orders at a retail establishment comprising:
   a digital processor for controlling the operation of the dispenser;
   a digital processor keyboard connected to the digital processor for entering control data and transaction data by a vendor;
   a first security code authorizing access to the dispenser to enable entry of said control data;
   a second security code authorizing the printing of a money order;
   a display connected to the digital processor for displaying the transaction and control data entered on the digital processor keyboard;
   a memory associated with the digital processor for storing the transaction data and control data;
   a printer controlled by said digital processor for receiving a money order and printing alphanumeric indicia thereon;
   means for entering the control data and the initial first and second security codes;
   means for detecting entry of the first and second security codes via the digital processor keyboard and for detecting if the security of the dispenser is compromised;
   control means responsive to the detecting means for inhibiting entry of the control data via the digital processor keyboard when the first security code is not properly entered on the digital processor keyboard, for preventing the printing of a money order when the second security code is not properly entered on the digital processor keyboard, and for preventing operation of the dispenser when the security of the dispenser is compromised; and said money orders having a relatively long longitudinal side and a relatively short transverse side and having indicia pre-printed on the longitudinal side, said printer including a dot matrix printer extending across said transverse side of said money orders for receiving the money orders and printing said alphanumeric indicia thereon in the longitudinal direction.

4. The money order dispenser of claim 3 further including control means for controlling said dot matrix printer to change the orientation of said alphanumeric indicia such that said money orders are produced in a readable form.

* * * * *